US011176713B2

(12) United States Patent
Agrawal et al.

(10) Patent No.: US 11,176,713 B2
(45) Date of Patent: Nov. 16, 2021

(54) GENERATION OF CONTROLLED ATTRIBUTE-BASED IMAGES

(71) Applicant: ADOBE INC., San Jose, CA (US)

(72) Inventors: Shradha Agrawal, San Jose, CA (US); Deepak Pai, Santa Clara, CA (US); Dhanya Raghu, Los Angeles, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/778,906

(22) Filed: Jan. 31, 2020

(65) Prior Publication Data
US 2021/0241497 A1 Aug. 5, 2021

(51) Int. Cl.
*G06T 11/00* (2006.01)
*G06K 9/62* (2006.01)

(52) U.S. Cl.
CPC ............ *G06T 11/00* (2013.01); *G06K 9/6201* (2013.01); *G06K 9/6256* (2013.01); *G06K 9/6267* (2013.01); *G06T 2200/24* (2013.01)

(58) Field of Classification Search
CPC combination set(s) only.
See application file for complete search history.

(56) References Cited

U.S. PATENT DOCUMENTS

| 10,043,109 | B1 * | 8/2018 | Du | G06N 3/0454 |
|---|---|---|---|---|
| 2016/0039534 | A1 * | 2/2016 | Agrawal | G06K 9/00785 |
| | | | | 348/144 |
| 2016/0379132 | A1 * | 12/2016 | Jin | H04L 67/22 |
| | | | | 706/12 |
| 2018/0225812 | A1 * | 8/2018 | DiVerdi | G06K 9/4628 |
| 2019/0220694 | A1 * | 7/2019 | Biswas | G06K 9/6202 |
| 2019/0295302 | A1 * | 9/2019 | Fu | G06T 7/0002 |
| 2020/0043022 | A1 * | 2/2020 | Karmakar | G06F 16/355 |
| 2020/0193661 | A1 * | 6/2020 | Kaneko | G06T 11/40 |
| 2020/0402307 | A1 * | 12/2020 | Tanwer | G06Q 30/0201 |

OTHER PUBLICATIONS

Chenxi et al., "Attribute-Aware Generative Design With Generative Adversarial Networks", Jan. 1, 2020, IEEE Access, vol. 8, pp. 190710-190721 (Year: 2020).*

(Continued)

*Primary Examiner* — Wesner Sajous
(74) *Attorney, Agent, or Firm* — Shook, Hardy & Bacon L.L.P.

(57) ABSTRACT

Embodiments of the present disclosure are directed towards generating images conditioned on a desired attribute. In particular, an attribute-based image generation system can use a directional-GAN architecture to generate images conditioned on a desired attribute. A latent vector and a desired attribute are received. A feature subspace is determined for the latent vector using a latent-attribute linear classifier trained to determine a relationship between the latent vector and the desired attribute. An image is generated using the latent vector such that the image contains the desired attribute. In embodiments, where the feature space differs from a desired feature subspace, a directional vector is applied to the latent vector that shifts the latent vector from the feature subspace to the desired feature subspace. This modified latent vector is then used during generation of the image.

20 Claims, 13 Drawing Sheets

(56) References Cited

OTHER PUBLICATIONS

Liu et al., Collocating Clothes With Generative Adversarial Networks Cosupervised by Categories and Attributes: A Multidiscriminator Framework, Nov. 4, 2019, IEEE Transactions on Neural Networks and Learning Systems (vol. 31, Issue: 9, pp. 3540-3554) (Year: 2019).*

Zhang, Generative Adversarial Networks for Image Synthesis, Rutgers The State University of New Jersey—New Brunswick and University of Medicine and Dentistry of New Jersey. ProQuest Dissertations Publishing, 2019. 13917983 (Year: 2019).*

Abadi, M., Barham, P., Chen, J., Chen, Z., Davis, A., Dean, J., . . . & Kudlur, M. (2016). Tensorflow: A system for large-scale machine learning. In 12th {USENIX} Symposium on Operating Systems Design and Implementation ({OSDI} 16) (pp. 265-283).

Cao, Z., Simon, T., Wei, S. E., & Sheikh, Y. (2017). Realtime multi-person 2d pose estimation using part affinity fields. In Proceedings of the IEEE Conference on Computer Vision and Pattern Recognition (pp. 7291-7299).

Dong, H., Liang, X., Wang, B., Lai, H., Zhu, J., & Yin, J. (2019). Towards multi-pose guided virtual try-on network. arXiv preprint arXiv:1902.11026.

Goodfellow, I., Pouget-Abadie, J., Mirza, M., Xu, B., Warde-Farley, D., Ozair, S., . . . & Bengio, Y. (2014). Generative adversarial nets. In Advances in neural information processing systems (pp. 2672-2680).

He, K., Zhang, X., Ren, S., & Sun, J. (2016). Deep residual learning for image recognition. In Proceedings of the IEEE conference on computer vision and pattern recognition (pp. 770-778).

Howard, M. A. G. (2017). Mobilenets: Open-source models for efficient on-device vision.

Huang, X., & Belongie, S. (2017). Arbitrary style transfer in real-time with adaptive instance normalization. In Proceedings of the IEEE International Conference on Computer Vision (pp. 1501-1510).

Karras, T., Aila, T., Laine, S., & Lehtinen, J. (2017). Progressive growing of gans for improved quality, stability, and variation. arXiv preprint arXiv:1710.10196.

Karras, T., Laine, S., & Aila, T. (2019). A style-based generator architecture for generative adversarial networks. In Proceedings of the IEEE Conference on Computer Vision and Pattern Recognition (pp. 4401-4410).

Kingma, D. P., & Welling, M. (2013). Auto-encoding variational bayes. arXiv preprint arXiv:1312.6114.

Ledig, C., Theis, L., Huszár, F., Caballero, J., Cunningham, A., Acosta, A., . . . & Shi, W. (2017). Photo-realistic single image super-resolution using a generative adversarial network. In Proceedings of the IEEE conference on computer vision and pattern recognition (pp. 4681-4690).

Lin, T. Y., Maire, M., Belongie, S., Hays, J., Perona, P., Ramanan, D., . . . & Zitnick, C. L. (Sep. 2014). Microsoft coco: Common objects in context. In European conference on computer vision (pp. 740-755). Springer, Cham.

Liu, W., Anguelov, D., Erhan, D., Szegedy, C., Reed, S., Fu, C. Y., & Berg, A. C. (Oct. 2016). Ssd: Single shot multibox detector. In European conference on computer vision (pp. 21-37). Springer, Cham.

Liu, Z., Luo, P., Qiu, S., Wang, X., & Tang, X. (2016). Deepfashion: Powering robust clothes recognition and retrieval with rich annotations. In Proceedings of the IEEE conference on computer vision and pattern recognition (pp. 1096-1104).

Lu, Y., Tai, Y. W., & Tang, C. K. (2018). Attribute-guided face generation using conditional CycleGAN. In Proceedings of the European Conference on Computer Vision (ECCV) (pp. 282-297).

Mirza, M., & Osindero, S. (2014). Conditional generative adversarial nets. arXiv preprint arXiv:1411.1784.

Brock, A., Donahue, J., & Simonyan, K. (2018). Large scale gan training for high fidelity natural image synthesis. arXiv preprint arXiv:1809.11096.

* cited by examiner

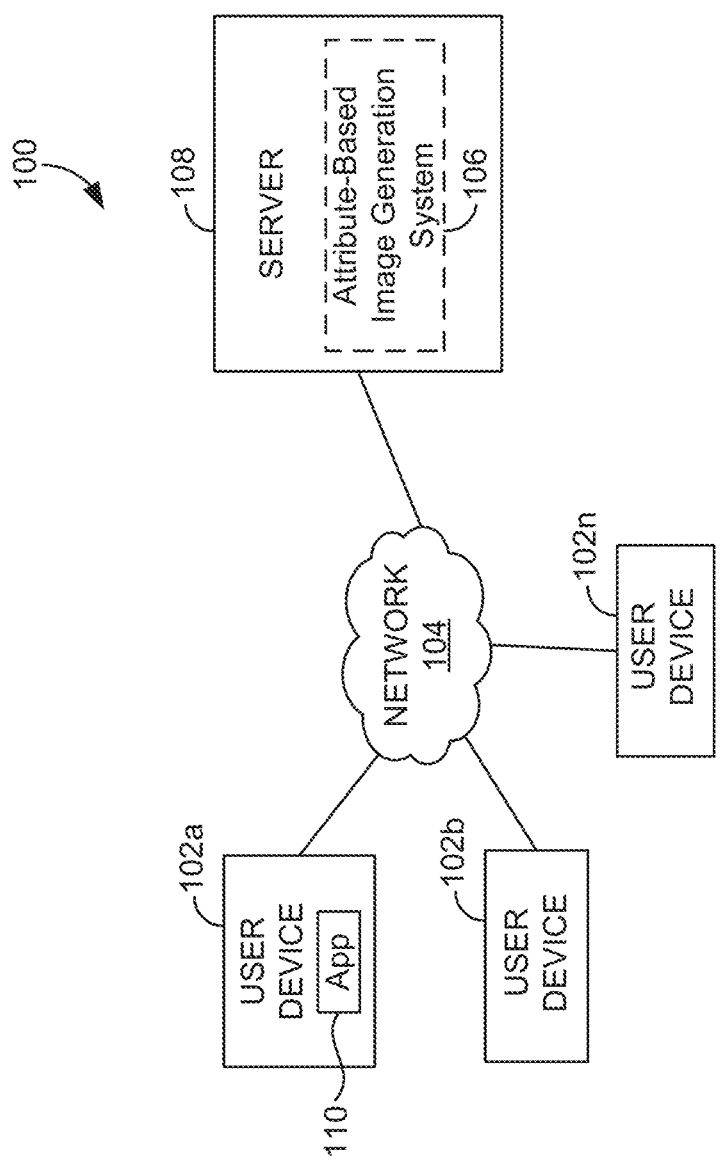

GENERATION OF CONTROLLED ATTRIBUTE-BASED IMAGES

BACKGROUND

When creating content, content creators (e.g., users) oftentimes wish to tailor the content based on a particular customer (e.g., consumer). For instance, a user can tailor content based on attributes and/or areas of interest of a target audience (e.g., gender, age, job, hobbies). As an example, a user might create content with an image of a woman in a suit on a website homepage when the target audience are women lawyers. The appearance of such a website homepage containing an image that a consumer identifies with can result in heightened interactions with the website (e.g., increased browsing, purchasing an item, etc.). A user can attempt to capture such attributes and/or areas of interest by carefully selecting consumer tailored images to include in content for a target audience.

SUMMARY

Embodiments of the present disclosure are directed towards generating images conditioned on desired attributes. In particular, an attribute-based image generation system of the present disclosure can generate high-resolution images that contain desired attributes. The attribute-based image generation system can be implemented using a directional-GAN. Such a directional-GAN can be based on an image generation neural network and classifier components (e.g., an image-attribute classifier and a latent-attribute classifier).

The attribute-based image generation system can allow for direct control over attributes in generated images. In particular, the attribute-based image generation system can identify one or more feature space in a latent space associated with a latent vector (e.g., that can be used by an image generation neural network to generate an image). A feature space can correspond to a particular attribute that can be included in a generated image based on the latent vector. Understanding how a latent vector relates to one or more desired attributes based on the feature space (e.g., corresponding to an attribute) in a latent space allows the latent vector to be shifted to correspond with a desired attribute. The ability to shift a latent vector based on a feature space corresponding to a desired attribute allows for direct control over the latent vectors used to generate images. In this way, controlling latent vectors ensures that generated images contain one or more desired attributes.

BRIEF DESCRIPTION OF THE DRAWINGS

FIG. 1A depicts an example configuration of an operating environment in which some implementations of the present disclosure can be employed, in accordance with various embodiments.

DETAILED DESCRIPTION

Figure 1B:
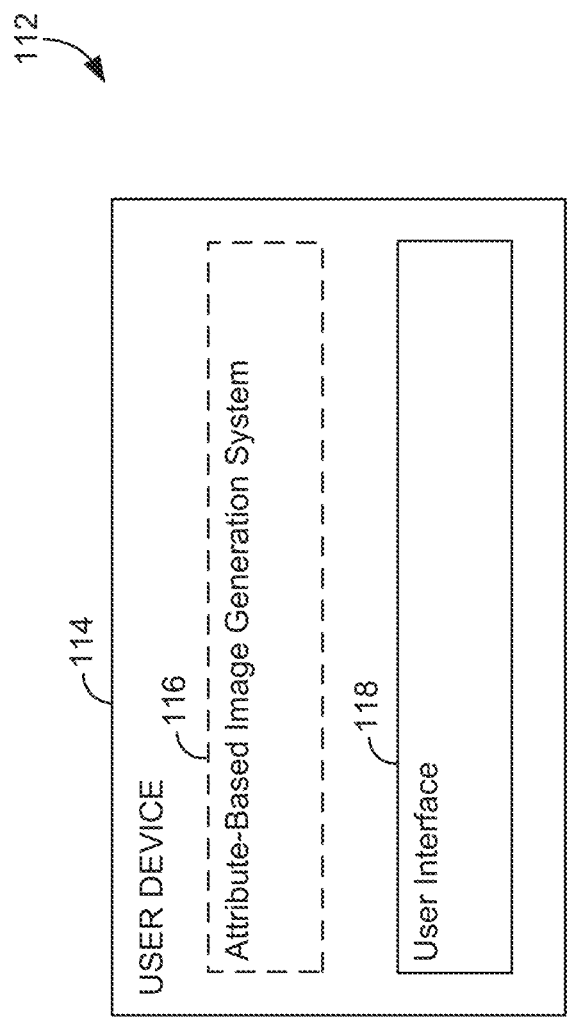
FIG. 1B depicts another example configuration of an operating environment in which some implementations of the present disclosure can be employed, in accordance with various embodiments.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various terms and phrases are used herein to describe embodiments of the present invention. Some of the terms and phrases used herein are described here, but more details are included throughout the description.

As used herein, the term "attribute-based image generation system" refers to a system capable of generating high-resolution images that contain a desired attribute. For instance, the attribute-based image generation system can be a directional-GAN that can generate images conditioned on a desired attribute. Such a directional-GAN can included an image generation neural network and two classifier components (e.g., an image-attribute classifier and a latent-attribute classifier). As an example, the attribute-based image generation system can generate full-body human images conditioned on a desired attribute as indicated by a user. For instance, if the user selected a desired attribute based on a style of clothing as "dress," the attribute-based image generation system can generate a high-resolution image of a full-body human wearing a dress.

As used herein, the term "image generation neural network" refers to a neural network trained to generate high-resolution images. Such an image generation neural network can be based on a GAN architecture. During training, a GAN can be comprised of a generator and a discriminator. In particular, the generator portion can generate images from an input (e.g., a latent vector), and the discriminator portion can evaluate the generated images for realism or authenticity (e.g., the discriminator decides whether an image is "real" or "fake"). In embodiments, upon training such an image generation neural network, just the generator can be used in implementing the image generation neural network in the directional-GAN (e.g., the discriminator is just needed during training of the image generation neural network).

As used herein, the term "image-attribute classifier" refers to one or more neural network trained to classify images. In particular, the image-attribute classifier can be comprised of one or more image-attribute classification neural network(s) that can classify images. Such an image-attribute classification neural network can be a pretrained classifier. The image-attribute classification neural network can be used to identify (e.g., classify) an attribute of interest in an image (e.g., images generated using the trained image generation neural network). For example, an image-attribute classification neural network can identify whether an image contains a particular clothing style (e.g., dress or t-shirt). As another example, an image-attribute classification neural network can identify whether an image contains a particular pose (e.g., forward or backward).

As used herein, the term "latent-attribute linear classifier" refers to a classifier trained to learn a linear separating plane over dimensions of a latent space related to particular attributes. For instance, the latent-attribute linear classifier can identify a hyperplane in a feature space that separates one feature value from another. As an example, a latent-attribute linear classifier can analyze a received latent vector to determine which feature subspace the latent vector relates to (e.g., whether the latent vector falls in one feature value subspace or another feature value subspace). This information can be used to determine a direction, along which the latent vector could move from one space to another space (e.g., shifting the latent vector from generating an image with one value of the attribute (front-pose) to generating an image with another value of the same attribute (back-pose)).

The term "latent vector" is used herein to refer to a randomly generated latent vector. This randomly generated latent vector can be used by the image generation neural network of the directional-GAN to generate images. The directional-GAN allows for direct control over such latent vectors. In particular, understanding how a latent vector relates to one or more attributes based on a feature space (e.g., corresponding to an attribute) in a latent space allows the latent vector to be shifted to correspond with a desired attribute.

The term "feature subspace" is used herein to refer to a portion of a latent space that corresponds to a particular attribute value. Various feature subspaces associated with attribute values (e.g., "t-shirt" and "dress") can be separated from each other by a hyperplane. For example, if a feature space relates to a full-body image of a person wearing a dress or wearing a t-shirt, the latent vector can either fall into a "dress space" or a "t-shirt space." A "dress space" can be the area of the feature space where latent vectors result in generated images of a full-body image of a person wearing a dress. A "t-shirt space" can be the area of the feature space where latent vectors result in generated images of a full-body image of a person wearing a t-shirt.

The term "desired attribute" is used herein to refer to an attribute that should be contained in a generated image. In particular, a desired attribute is an attribute that is used to condition the generated image. When a feature space for a latent vector is determined not to correspond to a desired attribute, the latent vector can be shifted to correspond to a feature space that corresponds to the desired attribute. In particular, the latent vector can be directed to move from one space to another space (e.g., shifting the latent vector from generating an image with one attribute to generating an image with another attribute).

The term "directional vector" is used herein to refer to a vector of certain direction and magnitude that is applied to a latent vector when the vector does not correspond to a desired attribute. For instance, when a latent vector can be analyzed to determine a corresponding feature space for the latent vector. When this feature subspace does not align with the feature subspace of a desired attribute, weighting can be applied to move the latent vector in the appropriate direction along the linear combination of directional vectors. For instance, for each attribute that needs weighting, a signed distance of the randomly generated latent vector from the separating hyperplane can be determined. The randomly generated latent vector can then be moved in the required direction (e.g., by an amount equal to negative of the signed distance and some delta (e.g., because the signed distance would place the weighted randomly generated latent vector directly on the hyperplane).

The term "user" is used herein to refer to a marketer, publisher, editor, author, or other person who employs the attribute-based image generation system described herein to generate images conditioned on desired attributes such that the images contain targeted content. A user can designate one or more desired attributes for an image. For instance, a user may select one or more desired attributes. Such attributes can be selected from, for example, a list of attributes on which a directional-GAN has been trained to condition images.

When creating content, users oftentimes want to tailor the content based on a target audience. For instance, a user may wish to create electronic content that includes an image that will reflect attributes and/or areas of interest of a target audience (e.g., target consumer). The appearance of such an image can entice a consumer to visit a web site, purchase a product, etc. As an example, a consumer might see a person in an image that they identify with wearing an item of clothing. Because the consumer identifies with the person in the image, this can result in a higher interest in purchasing the item of clothing. A user can attempt to capture such attributes and/or areas of interest by carefully selecting consumer tailored images to include in targeted content.

Conventional methods for obtaining images to include tailored content have limitations. In particular, conventional methods for generating images that are tailored to a particular interest or consumer attribute often rely on manual creation. For instance, images can be generated by selecting a particular person as a model that will wear specific clothing styled in a certain manner. However, such approaches have limited applicability. In particular, using such approaches to create tailored images to include in targeted content are not practical; it is nearly impossible to generate images that will appeal to every target audience (e.g., hundreds of images can be required for a single item of clothing). As such, these approaches fail to allow for obtaining consumer tailored images that include targeted content.

One method that has been attempted to overcome the deficiencies of manual creation of consumer tailored images are generative adversarial neural networks (e.g., GANs). For instance, some conventional approaches use GANs in an attempt to automatically generate tailored content. In particular, some conventional approaches use conditional GANs, conditioned based on a class of desired content a user would like to generate. However, conventional conditional GANs have had limited success. For instance, style transfer has been attempted (e.g., using StyleGAN). However, using such an approach requires numerous runs of a generator to obtain an image containing desired content which is computationally inefficient. As such, these methods can be unreliable and fail to generate images that actually contain desired content without requiring multiple attempts.

Further, conventional conditional GANs have had difficulty generating high quality (e.g., high-resolution) images. In an attempt to overcome this deficiency, progressive GANs have been introduced. However, conditioning on such progressive GANs can fail to allow generation of imaged conditioned on a desired attribute. As such, conventional approaches fail to allow for consistently generating high quality images that contain desired content.

Accordingly, embodiments of the present disclosure present a solution that generates image conditioned on a desired attribute. In particular, an image generation system (e.g., an attribute-based image generation system) of the present disclosure can generate high-resolution images that contain a desired attribute. For instance, aspects of the attribute-based image generation system can be trained to generate high-resolution images conditioned on a desired attribute. This desired attribute can be targeted content such that the attribute-based image generation system can generate consumer tailored images that include the targeted content. As an example, the generated images can be full-body human images conditioned on the desired attribute: style of clothing (e.g., a t-shirt or dress). As another example, the generated images can be full-body human images conditioned on the desired attribute: pose of the person in the image (e.g., a front pose or a back pose). Advantageously, such a system can be trained to generate any image conditioned on one or more desired attribute. As such, the attribute-based image generation system can generate high-resolution consumer tailored images conditioned on a desired attribute such that the images contain targeted content.

Portions of such an attribute-based image generation system can be implemented using one or more machine learning models (e.g., neural networks, linear classifiers, etc.). A neural network generally refers to a computational approach using large clusters of connected neurons. Neural networks are self-learning and trained rather than explicitly programmed such that the generated output of a neural network reflects a desired result. A linear classifier can make a classification decision based on a value of a linear combination of characteristics of an object. In particular, the attribute-based image generation system can be comprised of an image generation neural network, an image-attribute classifier (e.g., one or more image-attribute classification neural networks), and a latent-attribute linear classifier (e.g., one or more latent-attribute linear classifiers).

In particular, in some embodiments, the attribute-based image generation system can use a directional-GAN architecture. Such a directional-GAN architecture is advantageous because it allows for direct control over inputs (e.g., latent vectors) into a trained GAN. This direct control can be based on understanding of how directional vectors in the latent space are related to one or more attributes. Such a directional-GAN can be comprised of various components. For instance, the directional-GAN can included an image generation neural network (e.g., a trained GAN based on a generator/discriminator) and two classifier components (e.g., an image-attribute classifier and a latent-attribute classifier). Such a directional-GAN architecture is described further below.

In more detail, the attribute-based image generation system can implement an image generation neural network that generates images conditioned on a desired attribute. Such an image generation neural network can be based on a GAN architecture. A GAN architecture can be comprised of a generator and a discriminator. In particular, the generator portion can generate images from an input (e.g., a vector), and the discriminator portion can evaluate the generated images for realism or authenticity (e.g., the discriminator decides whether an image is "real" or "fake"). In embodiments, upon training such an image generation neural network, just the generator can be used in implementing the image generation neural network (e.g., the discriminator is just needed during training of the image generation neural network).

The classifier components can include an image-attribute classifier and a latent-attribute classifier. These components can provide insight into how vectors input into the image generation neural network relate to a desired attribute. In particular, the classifier components can provide control over the vectors input into the image generation neural network such that the images generated by the network contain one or more desired attribute. For instance, the image-attribute classifier can be used during training of the latent-attribute classifier. The image-attribute classifier can predict the presence of one or more attributes of interest in an image such that the latent-attribute classifier can learn the relationship between latent vectors and the likelihood that one or more attributes of interest will be present in an image generated based on a latent vector.

To train the image generation neural network of the directional-GAN, a generator and discriminator can be progressively trained in an adversarial manner. Progressive training allows the generator and discriminator to be trained at different resolutions. For instance, the generator and discriminator are initially trained at a low resolution (e.g., 1×4) and then gradually the resolution is increased (e.g., up to 128×512). In this way, there are multiple layers in the generator for the different resolutions (where initial layers are the lower resolution and the later layers are the higher resolutions). In the discriminator, there are also multiple layers for the different resolutions (where initial layers are the higher resolution and the later layers are the lower resolutions).

As an example of such progressive training, during training, there is initially just one layer in the generator and the discriminator, each layer at the resolution 1×4. During the next iteration of training, another layer is added to each of the generator and the discriminator, at the resolution 2×8. Next, layers with the resolution 4×16 are added to each of the generator and the discriminator. Layers can continued to be added until a layer with the resolution 128×512 is reached.

During this progressive training, the generator and the discriminator can be trained in an adversarial manner where the input to the generator is a randomly generated vector whereas the input to the discriminator is the output of generator and images from the dataset. Such adversarial training means that the generator and the discriminator are trained simultaneously as a min/max optimization. In particular, the generator can try to generate real looking images from the input randomly generated vectors while the discriminator tries to distinguish images output by the generator from the real images of the dataset. Generally, "real"

images can be defined as images that are realistic and "fake" images can be defined as images that are not realistic.

The process of training the image generation neural network can be repeated for a sufficiently large number of cycles. For instance, training can continue until the discriminator can no longer determine that generated images differ from real images. In some embodiments, training can continue until the error stops decreasing from iteration to iteration. In further, embodiments, a predefined number of epochs can be used to train the image generation neural network (e.g., 300 epochs). Such a predefined number of epochs can balance the tradeoff between time and computational resources using during training and the accuracy of the functioning network.

Upon completion of training of the image generation neural network (e.g., using a progressive GAN), the trained image generation neural network can be used to generate images from randomly generated latent vectors. To learn how to control the images generated by the network, such that the images contain one or more desired attribute, it must be understood which subspace of latent space corresponds to those desired attribute values. As such, the classifier components of the directional-GAN can be used to provide insight into how latent vectors used by the image generation neural network to generate images relate to a desired attribute value. These classifier components can comprise image-attribute classifiers and latent-attribute classifiers.

First, the images generated by the image generation neural network using as input randomly generated latent vectors can be fed into an image-attribute classifier (e.g., comprised of one or more trained classification neural networks). This image-attribute classifier can be used to predict the presence of one or more attributes of interest in an image. The image-attribute classifier can provide a set of labels for the image (e.g., one label per attribute class).

In more detail, the image-attribute classifier can be comprised of one or more image-attribute classification neural network(s) that can classify images (e.g., images generated by the image generation neural network). Such an image-attribute classification neural network can be a pretrained classifier (e.g., trained independently from the generator and discriminator). The image-attribute classification neural network can be used to identify (e.g., classify) an attribute of interest in an image (e.g., images generated using the trained image generation neural network). For example, an image-attribute classification neural network can predict whether an image contains a particular clothing style (e.g., dress or t-shirt). As another example, an image-attribute classification neural network can predict whether an image contains a particular pose (e.g., forward or backward).

Second, the randomly generated latent vectors used by the image generation neural network to generate images along with the presence of one or more attributes of interest in the images (e.g., as determined using the image-attribute classifier) can be fed into a latent-attribute linear classifier block. Each classifier in this latent-attribute linear block classifier can be trained to learn a linear separating plane over dimensions of a latent space related to a particular attribute value. For instance, a latent-attribute linear classifier can indicate the hyperplane in a feature space that separates one feature value from another. As an example, a latent-attribute linear classifier can analyze a received latent vector to determine which feature subspace the latent vector relates to (e.g., whether the latent vector falls in one subspace or another). This information can be used to determine a direction vector that can be applied to the latent vector to move from one space to another space (e.g., shifting the latent vector from generating an image with one attribute to generating an image with another attribute).

Moving a latent vector can be based on a desired attribute for an image. For example, if a feature subspace relates to a full-body image of a person wearing a dress or wearing a t-shirt, the latent vector can either fall into a "dress subspace" or a "t-shirt subspace." A "dress subspace" can be the area of the feature space where latent vectors result in generated images of a full-body image of a person wearing a dress. A "t-shirt subspace" can be the area of the feature space where latent vectors result in generated images of a full-body image of a person wearing a t-shirt. If an input latent vector indicates that the generated image will fall in an undesired subspace (e.g., a desired attribute for the image is dress and the latent vector is in the "t-shirt subspace"), a direction vector can be determined that will move the latent vector from the undesired subspace to the desires subspace (e.g., from the "t-shirt subspace" to the "dress subspace"). This shifted latent vector can then be input into the trained image generation neural network to generate an image with the desired attribute.

In this way, images can be generated by the image generation neural network that are conditioned on a desired attribute. In particular, a randomly generated latent vector can be passed through the latent-attribute linear classifier. The latent-attribute linear classifier can indicate whether the randomly generated latent vector will result in an image that is conditioned on the desired attribute. When the latent-attribute linear classifier determines that a randomly generated latent vector is likely to generate an image with an attribute different from the desired attribute, the latent vector can be moved accordingly to achieve the desired outcome (e.g., generate an image with the desired attribute). Once the randomly generated latent vector is determined to generate an image with the desired attribute, the latent vector can be input into the image generation neural network. It should be appreciated that such directionality can be used to directly control any number of desired attributes. In this way, images generated by the image generation neural network can contain one or more desired attribute.

FIG. 1A depicts an example configuration of an operating environment in which some implementations of the present disclosure can be employed, in accordance with various embodiments. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 10.

It should be understood that operating environment 100 shown in FIG. 1A is an example of one suitable operating environment. Among other components not shown, operating environment 100 includes a number of user devices, such as user devices 102*a* and 102*b* through 102*n*, network 104, and server(s) 108. Each of the components shown in FIG. 1A may be implemented via any type of computing device, such as one or more of computing device 1000 described in connection to FIG. 10, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other components may be employed within operating environment 100 within the scope of the present disclosure. Each may comprise a single device or multiple devices cooperating in a distributed environment.

User devices 102a through 102n can be any type of computing device capable of being operated by a user. For example, in some implementations, user devices 102a through 102n are the type of computing device described in relation to FIG. 10. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1A. Application 110 is referred to as a single application for simplicity, but its functionality can be embodied by one or more applications in practice. As indicated above, the other user devices can include one or more applications similar to application 110. As an example, application 110 can be any one of ADOBE PHOTOSHOP, ADOBE ILLUSTRATOR, ADOBE CAPTURE, ADOBE BEHANCE, and ADOBE INDESIGN.

The application 110 may generally be any application capable of facilitating the exchange of information between the user devices and the server(s) 108 in carrying out image generation conditioned on a desired attribute. In some implementations, the application 110 comprises a web application, which can run in a web browser, and could be hosted at least partially on the server-side of environment 100. In addition, or instead, the application 110 can comprise a dedicated application, such as an application having image processing functionality. In some cases, the application 110 is integrated into the operating system (e.g., as a service). It is therefore contemplated herein that "application" be interpreted broadly.

In accordance with embodiments herein, the application 110 facilitates image generation conditioned on a desired attribute. In embodiments, a desired attribute is received on which to condition an image. The desired attribute can be selected or input in any manner. For example, a user may select one or more desired attributes. Such attributes can be selected from, for example, a repository stored in a data store accessible by a network or stored locally at the user device 102a. Based on the input desired attribute, (e.g., provided via a user device or server), an image can be generated. The image can be conditioned on the desired attribute (e.g., be an image that contains the input desired attribute(s)). The generated image can be output to a user, for example, to the user via the user device 102a. For instance, in one embodiment, the generated image can be displayed via a display screen of the user device.

As described herein, server 108 can facilitate image generation conditioned on a desired attribute via attribute-based image generation system 106. Server 108 includes one or more processors, and one or more computer-readable media. The computer-readable media includes computer-readable instructions executable by the one or more processors. The instructions may optionally implement one or more components of attribute-based image generation system 106, described in additional detail below.

Portions of attribute-based image generation system 106 can train and/or operate one or more machine learning models. For instance, attribute-based image generation system 106 can include an image generation neural network, an image-attribute classifier (e.g., one or more image-attribute classification neural networks), and a latent-attribute linear classifier. Once trained, the image generation neural network can generate images using input latent vectors. These input latent vectors can be randomly generated latent vectors or randomly generated latent vectors moved using a directional vector. A randomly generated latent vector can be used when the latent-attribute linear classifier indicates that the latent vector will generate an image that contains one or more desired attributes. A randomly generated latent vector moved using a directional vector can occur when the latent-attribute linear classifier indicates that the randomly generated latent vector will not generate an image that contains one or more desired attribute. In this case, the randomly generated latent vector can be modified to shift the latent vector from one space or another space that will result generating an image with the one or more desired attribute.

For cloud-based implementations, the instructions on server 108 may implement one or more components of attribute-based image generation system 106, and application 110 may be utilized by a user to interface with the functionality implemented on server(s) 108. In some cases, application 110 comprises a web browser. In other cases, server 108 may not be required, as further discussed with reference to FIG. 1B. For example, the components of attribute-based image generation system 106 may be implemented completely on a user device, such as user device 102a. In this case, attribute-based image generation system 106 may be embodied at least partially by the instructions corresponding to application 110.

Referring to FIG. 1B, aspects of an illustrative attribute-based image generation system are shown, in accordance with various embodiments of the present disclosure. FIG. 1B depicts a user device 114, in accordance with an example embodiment, configured to allow for image generation conditioned on a desired attribute using an attribute-based image generation system 116. The user device 114 may be the same or similar to the user device 102a-102n and may be configured to support the attribute-based image generation system 116 (as a standalone or networked device). For example, the user device 114 may store and execute software/instructions to facilitate interactions between a user and the attribute-based image generation system 116 via the user interface 118 of the user device.

A user device can be utilized by a user to perform image generation conditioned on a desired attribute. In particular, a user can select and/or input a desired attribute utilizing user interface 118. A desired attribute can be selected or input in any manner. The user interface may facilitate the user accessing one or more desired attribute(s). As can be appreciated, images can be generated without specific user selection of one or more desired attribute. Based on the desired attribute(s), attribute-based image generation system 116 can be used to generate an image conditioned on the desired attribute using various techniques, some of which are further discussed below. User device 114 can also be utilized for displaying the generated image.

Figure 2:
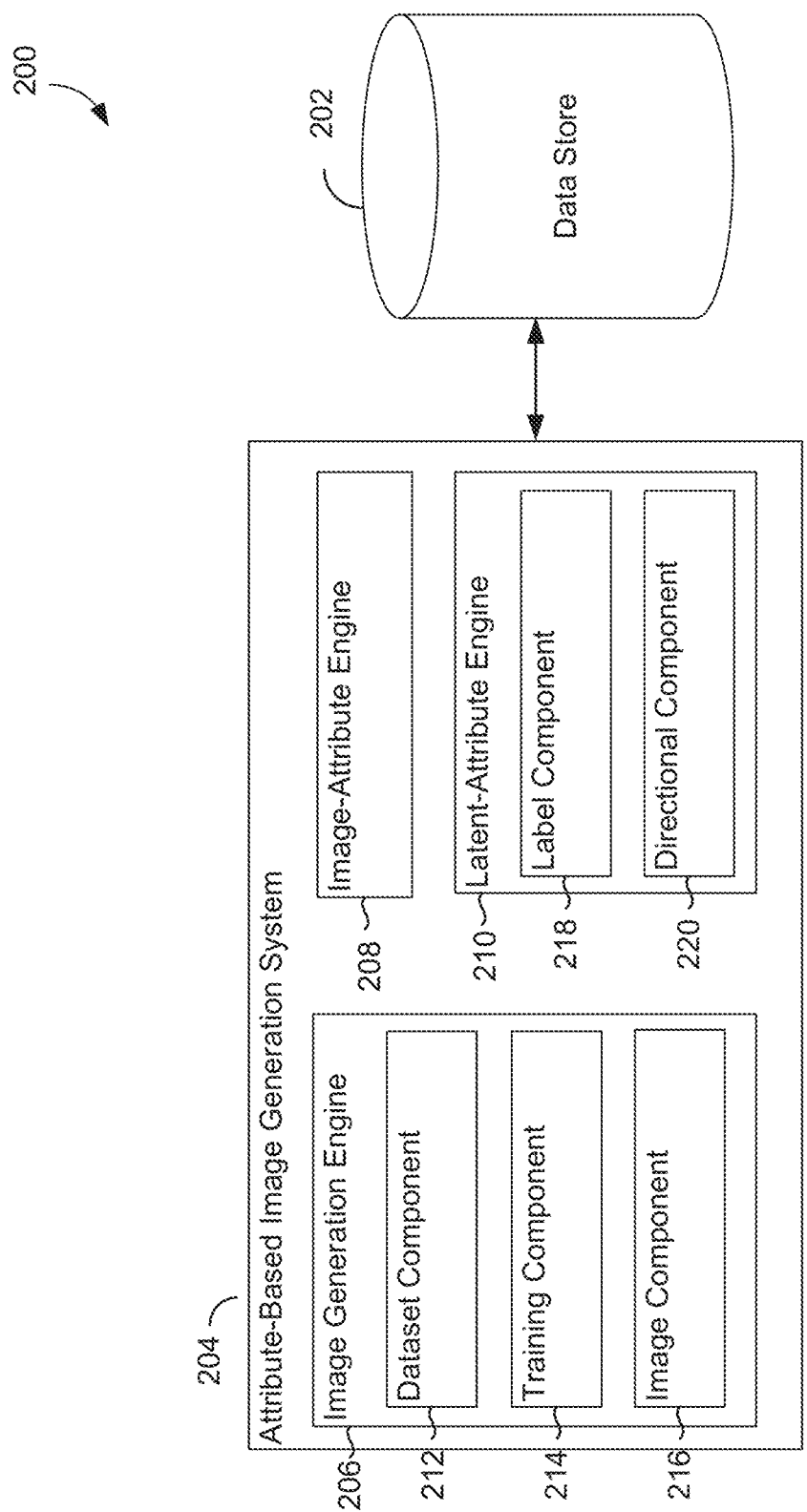
FIG. 2 depicts a further example configuration of an operating environment in which some implementations of the present disclosure can be employed, in accordance with various embodiments of the present disclosure.

Referring to FIG. 2, aspects of an illustrative image generation environment 200 are shown, in accordance with various embodiments of the present disclosure. As depicted, attribute-based image generation system 204 includes image generation engine 206, image-attribute engine 208, and latent-attribute engine 210. The foregoing engines of attribute-based image generation system 204 can be implemented, for example, in operating environment 100 of FIG. 1A and/or operating environment 112 of FIG. 1B. In particular, those engines may be integrated into any suitable combination of user devices 102a and 102b through 102n and server(s) 106 and/or user device 114. While the various engines are depicted as separate engines, it should be appreciated that a single engine can perform the functionality of all engines. Additionally, in implementations, the functionality of the engines can be performed using additional engines and/or components. Further, it should be appreciated that the functionality of the engines can be provided by a system separate from the attribute-based image generation system.

As shown, an attribute-based image generation system can operate in conjunction with data store 202. Data store 202 can store computer instructions (e.g., software program instructions, routines, or services), data, and/or models used in embodiments described herein. In some implementations, data store 202 can store information or data received via the various engines and/or components of image enhancer 204 and provide the engines and/or components with access to that information or data, as needed. Although depicted as a single component, data store 202 may be embodied as one or more data stores. Further, the information in data store 202 may be distributed in any suitable manner across one or more data stores for storage (which may be hosted externally). In embodiments, data stored in data store 202 can include images generated by the image generation neural network. Such images can be input into data store 202 from a remote device, such as from a server or a user device. Such images can then be classified using the image-attribute classifier. These classifications can be stored in conjunction with the images.

Data store 202 can also be used to store one or more machine learning models during training and/or upon completion of training. Such machine learning models can include an image generation neural network, an image-attribute classifier (e.g., one or more image-attribute classification neural networks), and a latent-attribute linear classifier.

Attribute-based image generation system 204 can generally be used for generating images conditioned on a desired attribute. Specifically, the attribute-based image generation system can train and/or use machine learning models to generate images that contain one or more desired attributes.

In accordance with embodiments described herein, the attribute-based image generation system can be run using, for example, a directional-GAN architecture. Such a directional-GAN architecture can be comprised of an image generation neural network (e.g., a GAN comprised of a generator and a discriminator), an image-attribute classifier (e.g., comprised of one or more image-attribute classification neural networks), and a latent-attribute linear classifier.

As depicted, image generation engine 206 includes dataset component 210, training component 212, and image component 218. The foregoing components of image generation engine 206 can be implemented, for example, in operating environment 100 of FIG. 1A and/or operating environment 112 of FIG. 1B. In particular, those components may be integrated into any suitable combination of user devices 102a and 102b through 102n and server(s) 108 and/or user device 114. While the various components are depicted as separate components, it should be appreciated that a single component can perform the functionality of all components. Additionally, in implementations, the functionality of the components can be performed using additional components and/or engines. Further, it should be appreciated that the functionality of the components can be provided by an engine separate from the image generation engine.

Dataset component 212 can be used to process and/or generate data used to train the image generation neural network. The dataset used to train the image generation neural network can depend on the type of images that the image generation neural network should generate (e.g., images of people, images of cars, landscapes, etc.). As a non-limiting example, a dataset for training the image generation neural network can be images of people in clothing (e.g., Deep Fashion). In an image generation neural network trained to generate full-body human images, the training data can be selected such that the training images are full-body human images. In this way, the data can be preprocessed to filter out half-body images and image with only clothes. In embodiments that rely on image annotations to perform such filtering, a tensorflow detection API with SSD mobile net trained on a COCO dataset can be used (e.g., to identify full-body human images and crop out unwanted background elements to retain only the human in the image). Such preprocessing can be applied to any type of image generation neural network (e.g., an image generation neural network trained to generate cars can use only images containing an entire car).

In some embodiments, preprocessing can crop images in the dataset. Cropping can be based on a bounding box around the human in the image. During cropping, the images in the dataset can also be scaled. In this way, the dataset used for training the image generation neural network can be 128×512 images.

Training engine 218 can be used to train the image generation neural network. To train the image generation neural network, a generator and discriminator can be progressively trained in an adversarial manner. Progressive training allows the generator and discriminator to be trained at different resolutions. For instance, the generator and discriminator are initially trained at a low resolution (e.g., 1×4) and then gradually the resolution is increased (e.g., up to 128×512). In this way, there are multiple layers in the generator for the different resolutions (where initial layers are the lower resolution and the later layers are the higher resolutions). In the discriminator, there are also multiple layers for the different resolutions (where initial layers are the higher resolution and the later layers are the lower resolutions).

As an example of such progressive training, during training, there is initially just one layer in the generator and the discriminator, each layer at the resolution 1×4. During the next iteration of training, another layer is added to each of the generator and the discriminator at the resolution 2×8. Next, layers with the resolution 4×16 are added to each of the generator and the discriminator. Layers can continued to be added until a layer with the resolution 128×512 is reached.

During this progressive training, the generator and the discriminator can be trained in an adversarial manner. Such adversarial training means that the generator and the discriminator are trained simultaneously as a min/max optimization. In particular, the generator can try to generate real looking images while the discriminator tries to distinguish real from fake images. Generally, "real" images can be defined as images that are realistic and "fake" images can be defined as images that are not realistic.

The process of training the system can be repeated for a sufficiently large number of cycles. For instance, training can continue until the discriminator can no longer determine that generated images differ from real images. In some embodiments, a predefined number of epochs can be used to train the GAN (e.g., 300 epochs). In certain other embodiments, the training can continue until the error has stabilized and does not reduce any further. Such a redefined number of epochs or error stabilization can balance the tradeoff between time and computational resources using during training and the accuracy of the functioning network.

Upon completion of training of the image generation neural network (e.g., using a progressive GAN), image component 216 can run the trained image generation neural network to generate images from randomly generated latent vectors. Image generation engine 206 can interact with image-attribute engine 208 and latent-attribute engine 210 upon completion of training the image generation neural network.

In particular, an image generated by the image generation neural network can then be fed into image-attribute engine 208. The image-attribute engine can be an image-attribute classifier comprised of one or more trained classifiers. In one embodiment, the trained classifiers can be image-attribute classification neural networks. In this way, the image-attribute engine can be used to predict the presence of one or more attributes of interest in an image. For instance, the image-attribute engine can provide a set of labels for the image (e.g., one label per attribute class). Such an image-attribute classification neural network can be a pretrained classifier (e.g., trained independently from the generator and discriminator). The image-attribute classification neural network can be used to identify (e.g., classify) an attribute of interest in an image (e.g., images generated using the trained image generation neural network). For example, an image-attribute classification neural network can predict whether an image contains a particular clothing style (e.g., dress or t-shirt). As another example, an image-attribute classification neural network can predict whether an image contains a particular pose (e.g., forward or backward).

Image-attribute engine 208 can provide a set of labels for the image (e.g., one label per attribute class). These labeled images can be used to train one or more latent-attribute linear classifiers (e.g., one per attribute class) of latent-attribute engine 210. In particular, the latent-attribute linear classifier(s) of latent-attribute engine 210 can be comprised of one or more latent-attribute linear classifiers trained to learn a linear separating plane over dimensions of a latent space related to a particular attribute value.

As depicted, latent-attribute engine 210 includes label component 218 and directional component 220. The foregoing components of latent-attribute engine 206 can be implemented, for example, in operating environment 100 of FIG. 1A and/or operating environment 112 of FIG. 1B. In particular, those components may be integrated into any suitable combination of user devices 102a and 102b through 102n and server(s) 108 and/or user device 114. While the various components are depicted as separate components, it should be appreciated that a single component can perform the functionality of all components. Additionally, in implementations, the functionality of the components can be performed using additional components and/or engines. Further, it should be appreciated that the functionality of the components can be provided by an engine separate from the latent-attribute engine.

A latent-attribute linear classifier of latent-attribute engine 210 can indicate a hyperplane in a feature space that separates one feature from another. As an example, a latent-attribute linear classifier can receive a latent vector and, based on the latent vector, determine which feature subspace the latent vector relates to (e.g., whether the latent vector falls in the one subspace or another). This information can be used to determine a weight that can be applied to the latent vector to move from one subspace to another subspace. This can be based on a desired attribute for an image. For example, if a feature space relates to a full-body image of a person wearing a dress or wearing a t-shirt, the latent vector can either fall into a "dress subspace" or a "t-shirt subspace." A "dress subspace" can be the area of the feature space where latent vectors result in generated images of a full-body image of a person wearing a dress. A "t-shirt subspace" can be the area of the feature space where latent vectors result in generated images of a full-body image of a person wearing a t-shirt.

If the latent-attribute linear classifier indicates that an input latent vector will result in a generated image that will fall in an undesired space (e.g., a desired attribute for the image is dress and the latent vector is in the "t-shirt subspace"), directional component 220 can determine a directional vector (e.g., magnitude and direction) that will move the latent vector from the undesired space to the desired space (e.g., from the "t-shirt subspace" to the "dress subspace"). Such a modified latent vector (e.g., based on the magnitude and direction) can then be input into the trained image generation neural network to generate an image with the desired attribute (e.g., using image component 216 of image generation engine 206).

Figure 3:
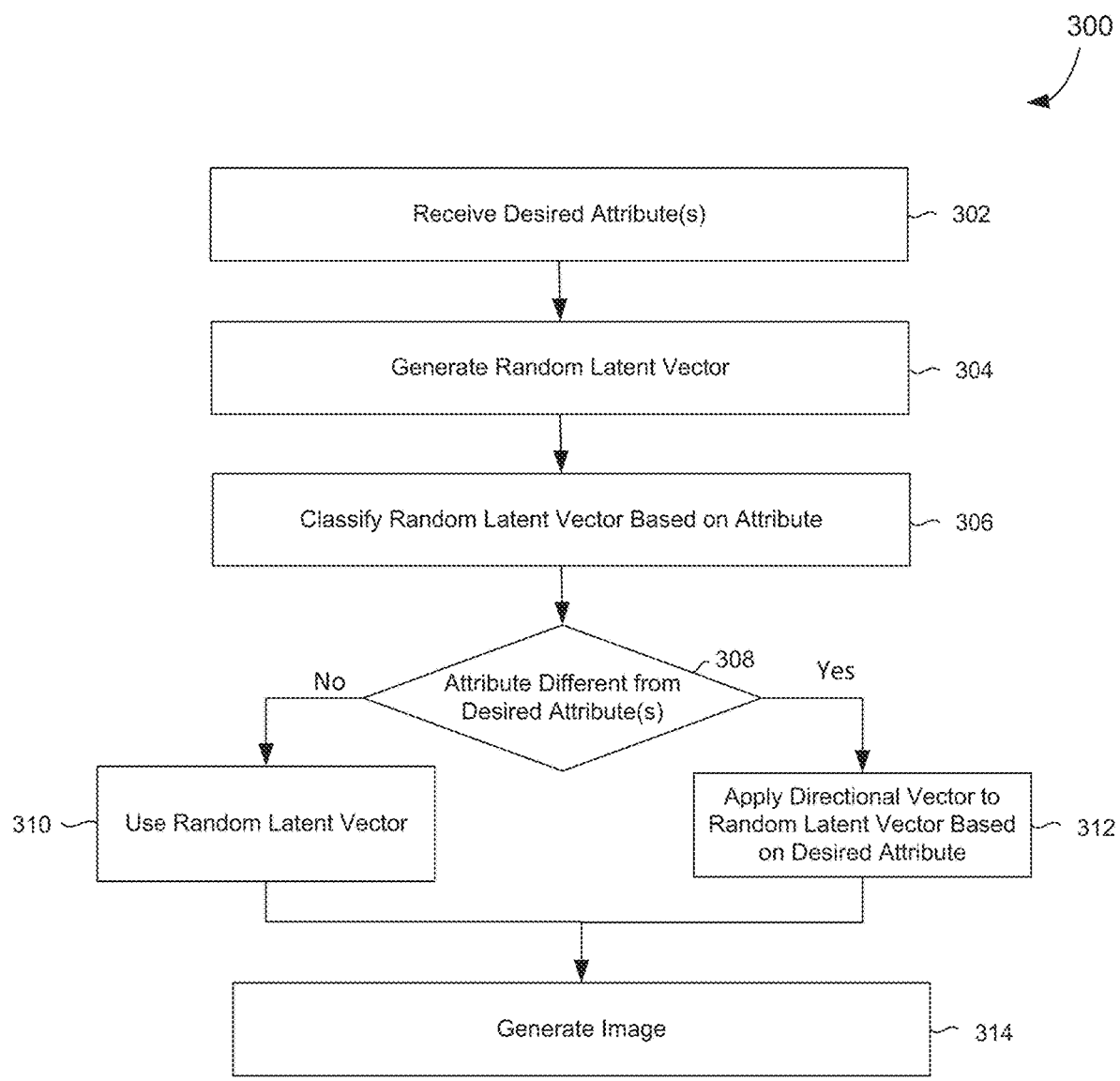
FIG. 3 depicts a process flow of an example for generating images conditioned on a desired attribute using a directional-GAN, in accordance with various embodiments of the present disclosure.

With reference to FIG. 3, a process flow is provided showing an embodiment of method 300 for generating images conditioned on a desired attribute using a directional-GAN, in accordance with embodiments of the present disclosure. Aspects of method 300 can be performed, for example, by attribute-based image generation system 204, as illustrated in FIG. 2.

At block 302, desired attribute(s) can be received. The desired attribute can be selected or input in any manner. For example, a user may select one or more desired attributes. Such attributes can be selected from, for example, a list of attributes on which an attribute-based image generation system have been trained to condition images. At block 304, a random latent vector can be generated. At block 306, the randomly generated latent vector can be classified based on attributes. In particular, the randomly generated latent vector can be passed through a latent-attribute linear classifier. The latent-attribute linear classifier can output labels corresponding to the attributes of the randomly generated latent vector. This output can be XORed with the conditioning vector from the input. This XOR operation results in a chose vector (e.g., c) with 1s where the latent is likely to generate an attribute different from a desired attribute and 0 otherwise.

At block 308, a determination can be made as to whether the predicted attribute for the latent vector differs from the desired attribute(s). If the result of the determination at block 308 is that the predicted attribute for the latent vector is not different from the desired attribute(s) then processing continues to block 310. If the result of the determination at block 308 is that the predicted attribute for the latent vector is different from the desired attribute(s) then processing continues to block 312.

At block 310, the randomly generated latent vector can be used to generate an image at block 314. In particular, the randomly generated latent vector can be input into an image generation neural network. Because the randomly generated latent vector was determined at block 308 to correspond to the desired attribute(s), the image generated by the image generation neural network can contain desired attribute(s).

At block 312, a directional vector can be applied to the randomly generated latent vector when the latent is likely to generate an attribute different from the desired attribute. In particular, the latent vector can be moved in an appropriate direction along the linear combination of directional vectors to achieve the desired outcome (e.g., generate an image with the desired attribute). To move the randomly generated latent vector, a signed distance of the latent vector from the separating hyperplane can be computed. The randomly generated latent vector can then be moved in the appropriate direction based on the signed distance (e.g., an amount greater than the signed distance). At block 314, an image can be generated. In particular, the modified randomly generated latent vector can be input into an image generation neural network. Because the randomly generated latent vector was moved at block 312 to correspond to the desired attribute(s), the image generated by the image generation neural network can contain desired attribute(s).

Figure 4:
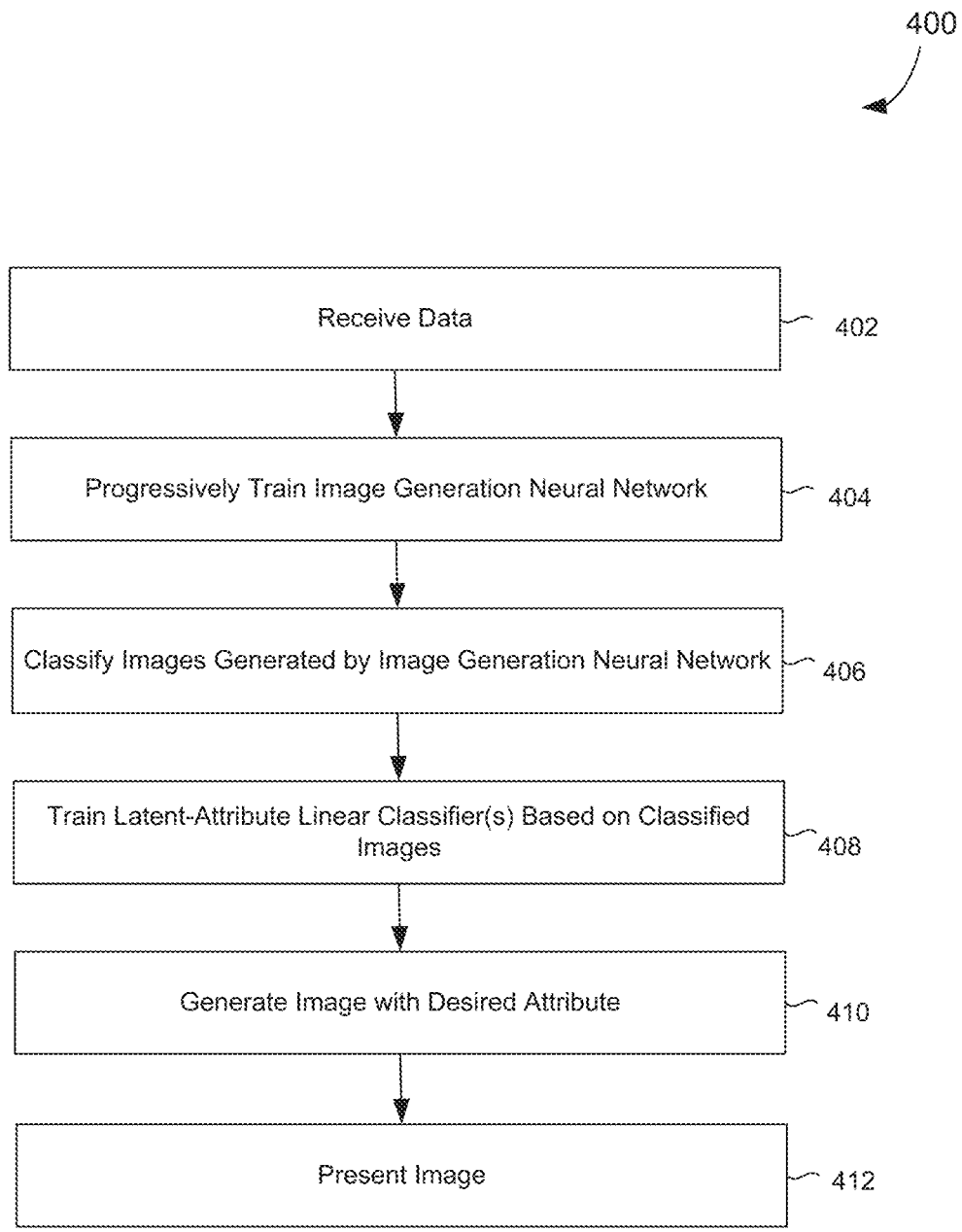
FIG. 4 depicts a process flow of an example for training and/or utilizing an attribute-based image generation system to generate images conditioned on a desired attribute, in accordance with various embodiments of the present disclosure.

With reference to FIG. 4, a process flow is provided showing an embodiment(s) of method 400 for training and/or utilizing an attribute-based image generation system to generate images conditioned on a desired attribute, in accordance with embodiments of the present disclosure. Such a method can take place using the attribute-based image generation system 204 as described with reference to FIG. 2.

An attribute-based image generation system trained and/or used in method 400 can be based on a directional-GAN framework. A directional-GAN framework can be comprised of an image generation neural network (e.g., a GAN comprised of a generator and a discriminator), an image-attribute classifier (e.g., comprised of one or more image-attribute classification neural networks), and a latent-attribute linear classifier (e.g., comprised of one or more latent-attribute linear classifier).

At block 402, data can be received. For example, data can be received and or selected from, for example, data store 202 of FIG. 2 and/or from an image database stored in the cloud. In embodiments, the data can comprise images for training. During training of the image generation neural network, input images can be selected based on the type of images to be generated. For example, when training an image generation neural network to generate full-body human images, the training data can be selected such that the training images are full-body human images. Is some embodiments, the training data can be preprocessed to generate a congruent set of images for training the image generation neural network. For instance, data can be preprocessed to filter out half-body images and image with only clothes. Further, images can be analyzed to identify full-body human images and crop out unwanted background elements to retain only the humans in the images.

At block 404, the image generation neural network can be progressively trained. Progressive training allows the generator and discriminator to be progressively trained at higher resolutions during each iteration of training. For instance, the generator and discriminator are initially trained at a low resolution (e.g., 1×4) and then gradually the resolution is increased (e.g., up to 128×512). In this way, there are multiple layers in the generator for the different resolutions (where initial layers are the lower resolution and the later layers are the higher resolutions). In the discriminator, there are also multiple layers for the different resolutions (where initial layers are the higher resolution and the later layers are the lower resolutions).

During this progressive training, the input into the generator can be randomly generated vectors and the input into a discriminator images generated by the generator or images from the training data. Such adversarial training means that the generator and the discriminator are trained simultaneously as a min/max optimization. In particular, the generator can try to generate "real" looking images from the input randomly generated vectors while the discriminator tries to distinguish images output by the generator from real images of dataset. Generally, "real" images can be defined as images that are realistic and "fake" images can be defined as images that are not realistic. This progressive training the image generation neural network can be repeated for a sufficiently large number of cycles.

At block 406, images generated by the image generation neural network can be classified. Such images can be generated from randomly generated vectors using the trained image generation neural network. An image-attribute classifier can be used to classify these images. Such an image-attribute classifier can be comprised of one or more trained classification neural networks. This image-attribute classifier can be used to predict the presence of one or more attributes of interest in the images. For instance, the image-attribute classifier can provide a set of labels for the images (e.g., one label per attribute class). These labels can indicate what attributes are present in the images.

At block 408, latent-attribute linear classifier(s) can be trained. Such training can be based on classified images (e.g., as determined at block 406). In particular, the randomly generated latent vectors used by the image generation neural network to generate images along with the presence of one or more attributes of interest in the images can be fed into a latent-attribute linear classifier. Using this information, a latent-attribute linear classifier can be trained to learn a linear separating plane over dimensions of a latent space related to a particular attribute. For instance, a latent-attribute linear classifier can indicate the hyperplane in a feature space that separates one feature value from others. Upon training the latent-attribute linear classifier(s), they can be used to analyze latent vectors to determine what feature subspaces the latent vector relates to (e.g., whether the latent vector falls in one subspace or another related to an attribute value).

At block 410, an image can be generated with a desired attribute. In particular, a latent vector can be randomly generated. This randomly generated latent vector can be analyzed using the trained latent-attribute linear classifier(s). The trained latent-attribute linear classifier(s) can determine what feature subspaces the latent vector relates to (e.g., what attributes an image generated using the latent vector will contain). This information can be used to determine a direction that can be applied to the randomly generated latent vector to move from one subspace to another subspace if the randomly generated latent vector will not generate an image with a desired attribute value.

The image generation neural network can then generate the image using an input latent vector. This input latent vector can be a randomly generated latent vector or appropriately modified using directional vectors. A randomly generated latent vector can be used when the latent-attribute linear classifier indicates that the latent vector will generate an image that contains one or more desired attribute. A randomly generated latent vector is moved when the latent-attribute linear classifier indicates that the randomly generated latent vector will not generate an image that contains one or more desired attribute. In this case, the randomly generated latent vector can be moved to shift the latent vector from one subspace or another subspace that will result generating an image with the one or more desired attribute.

Upon generating an image, the image can be presented at block 412. For instance, the image can be presented using a user device (e.g., user device 102a and/or user device 114). Such an image can be displayed using a graphical user interface on such a user device. For example, one or more desired attributes can be submitted by a user into an application on a user device, and upon generation of an image containing the one or more desired attributes, the image can be displayed to the user via the device. Such an image can then be used to create content (e.g., advertisement, emails, personalized webpages, etc.) that include consumer tailored images that include targeted content.

Figure 5:
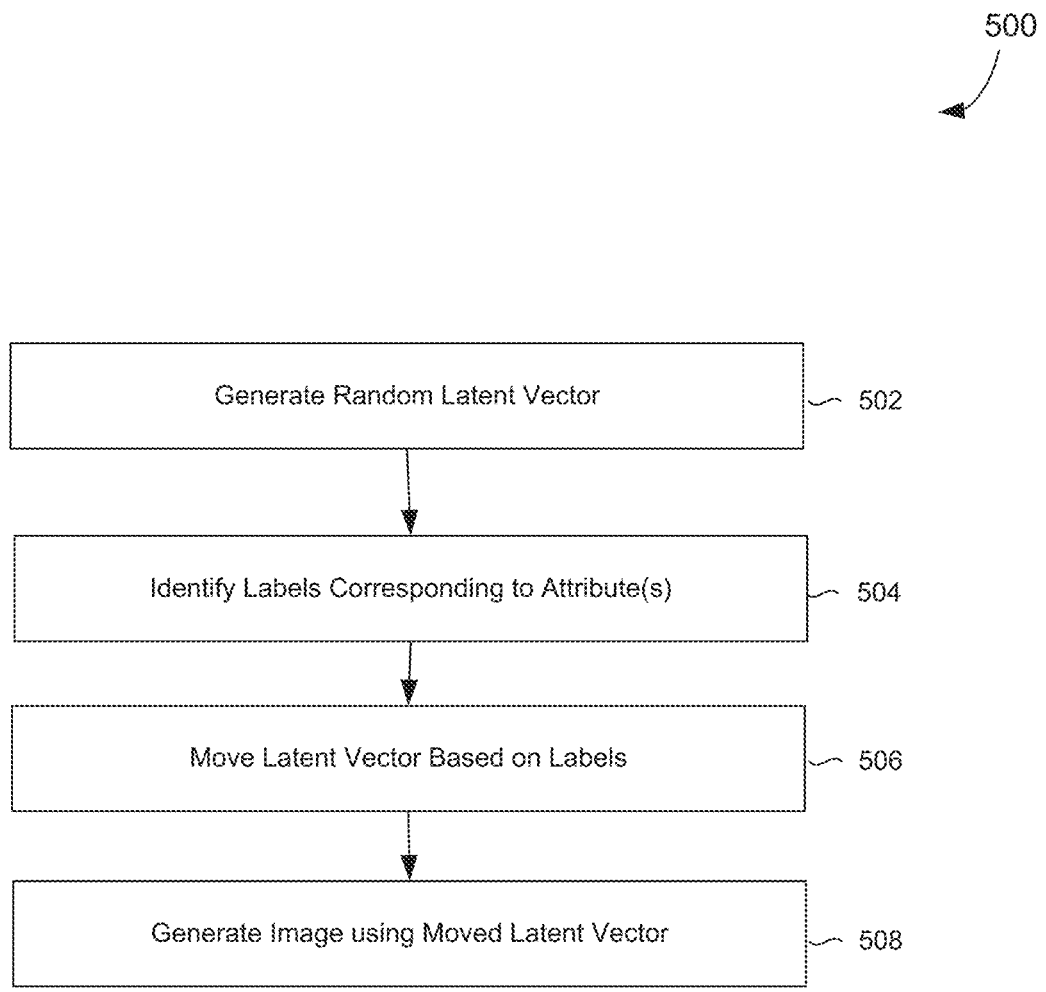
FIG. 5 depicts a process flow of an example for generating images conditioned on a desired attribute using a directional-GAN, in accordance with various embodiments of the present disclosure.

With reference to FIG. 5, a process flow is provided showing an embodiment of method 500 for generating images conditioned on a desired attribute using a directional-GAN in accordance with embodiments of the present disclosure. Aspects of method 500 can be performed, for example, by attribute-based image generation system 204, as illustrated in FIG. 2.

At block 502, a random latent vector can be generated. Upon randomly generating the latent vector, labels can be identified corresponding to attribute(s), at block 504. For instance, a set of labels can be identified for the image such that there is one label per attribute class. As a non-limiting example, if a directional-GAN is trained to generate full-body human images, a first attribute class can be a style of clothing (e.g., a t-shirt or dress) and a second attribute class can be pose of the person in the image (e.g., a front pose or a back pose). In such an example, the labels identified for a randomly generated latent vector can indicate what feature subspaces the randomly generated latent vectors falls into (e.g., a t-shirt/dress and front pose/back pose). When an attribute class has two options (e.g., style of clothing with an option of t-shirt/dress), a binary label can be used. When an attribute class has more than two options, additional labels can be used (e.g., 0, 1, 2, . . . , n).

At block 506, the randomly generated latent vector can be moved. In particular, the randomly generated latent vector can be moved when one or more of the labels identified for a randomly generated latent vector do not align with one or more desired attributes. Such desired attributes can be selected by a user. Such attributes can be selected from, for example, a list of attributes on which an attribute-based image generation system have been trained to condition images. The one or more of the labels identified for a randomly generated latent vector can be compared with one or more desired attributes. When the one or more of the labels do not align with the one or more desired attributes, the randomly generated latent vector can be moved accordingly. In particular, the latent-attribute linear classifier can be used to determine a magnitude and direction (e.g., directional vector) that can be applied to the randomly generated latent vector to move from one subspace to another subspace across a hyperplane. For instance, this can be a hyperplane in a feature space that separates one feature value from another (e.g., shifting the latent vector from generating an image with one attribute to generating an image with the desired attribute).

At block 508, an image can be generated. In particular, the randomly generated and appropriately moved latent vector can be input into an image generation neural network. Because the randomly generated latent vector was moved to correspond to the desired attribute(s), the image generated by the image generation neural network can contain desired attribute(s)

Figure 6:
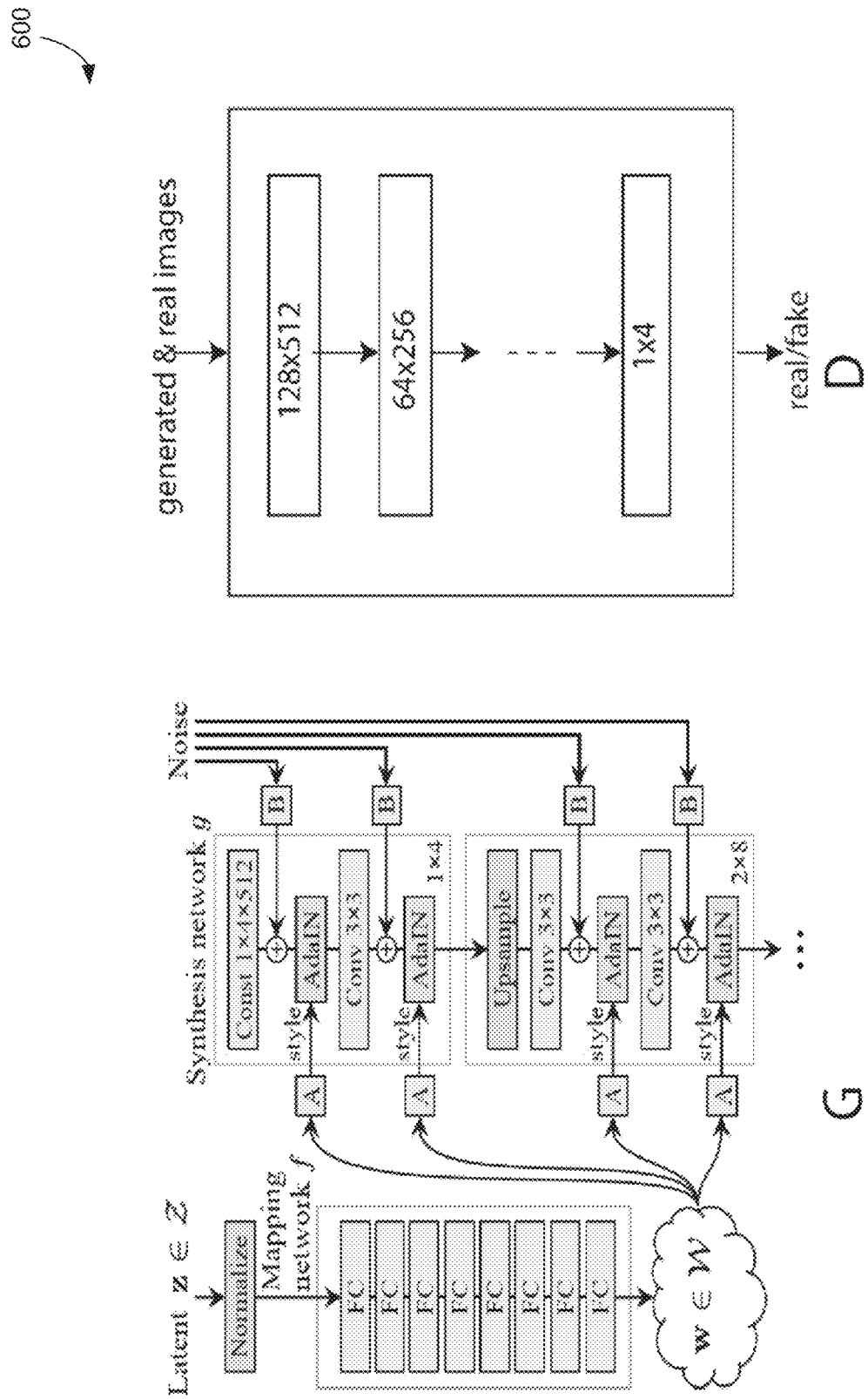
FIG. 6 depicts an example architecture that can be used for training an image generation neural network that can be used as a portion of a directional-GAN to generate images conditioned on a desired attribute, in accordance with various embodiments of the present disclosure.

FIG. 6 illustrates an example architecture can be used for training image generation neural network 600 that can be used to generate images conditioned on a desired attribute, in accordance with embodiments of the present disclosure. Such an image generation neural network can be based on a GAN architecture. A GAN architecture can be comprised of a generator and a discriminator. In particular, the generator portion can generate images from an input (e.g., latent vector z), and the discriminator portion can evaluate generated images and real images for realism or authenticity (e.g., the discriminator decides whether an image is "real" or "fake").

To train image generation neural network 600, a generator (e.g., G) and a discriminator (e.g., D) can be progressively trained in an adversarial manner. Progressive training allows the generator and discriminator to be progressively trained at higher resolutions. For instance, the generator and discriminator are initially trained at a low resolution (e.g., 1×4) and then gradually the resolution is increased (e.g., up to 128× 512). In this way, there are multiple layers in the generator for the different resolutions (where initial layers are the lower resolution and the later layers are the higher resolutions). In the discriminator, there are also multiple layers for the different resolutions (where initial layers are the higher resolution and the later layers are the lower resolutions).

The process of training image generation neural network 600 can be repeated for a sufficiently large number of cycles. For instance, training can continue until the discriminator can no longer determine that generated images differ from real images. In some embodiments, a predefined number of epochs can be used to train the image generation neural network (e.g., 300 epochs). In certain other embodiments, the training can continue until the error has stabilized and does not reduce any further. Such a predefined number of epochs or error stabilization can balance the tradeoff between time and computational resources using during training and the accuracy of the functioning network.

Upon completion of training of image generation neural network 600 (e.g., using a progressive GAN), the trained image generation neural network can be used to generate images from randomly generated latent vectors. In some embodiments, only the generator portion of the progressive GAN can be used when running trained image generation neural network 600.

Figure 7:
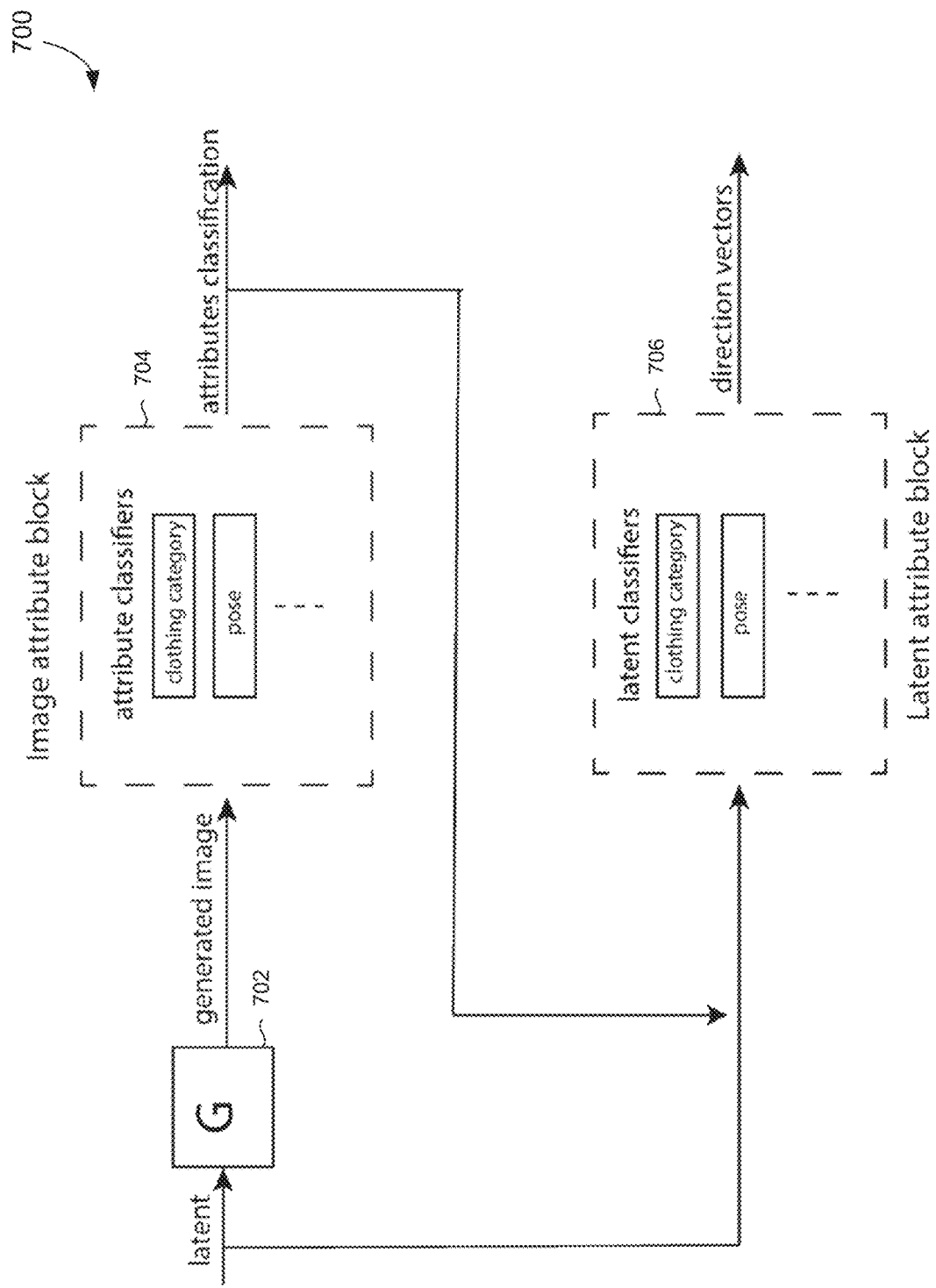
FIG. 7 depicts an example environment that can be used for training a latent-attribute linear classifier of a directional-GAN, in accordance with various embodiments of the present disclosure.

FIG. 7 illustrates an example environment 700 that can be used for training a latent-attribute linear classifier, in accordance with embodiments of the present disclosure. Such an example environment can be implemented using one or more machine learning models. In particular, the example environment 700 can include of image generation neural network 702, image-attribute classifier 704, and latent-attribute linear classifier 706. Image-attribute classifier 704 can be comprised of one or more image-attribute classification neural networks. Latent-attribute linear classifier 706 can be comprised of one or more latent-attribute linear classifiers.

A randomly generated latent vector can be input into image generation neural network 702. From the randomly generated latent vector, image generation neural network 702 can generate an image. The image generated by image generation neural network 702 can be fed into image-attribute classifier 704. Image-attribute classifier 704 can be used to predict the presence of one or more attributes of interest in the image. In particular, image-attribute classifier 704 can provide a set of labels for the image (e.g., one label per attribute class). For example, as depicted, a first attribute class can be clothing category (e.g., a t-shirt or dress) and a second attribute class can be pose (e.g., a front pose or a back pose of the person in the image).

Image-attribute classifier 704 can be used to predict the presence of one or more attributes of interest in the image using one or more image-attribute classification neural network(s). Such an image-attribute classification neural network can be a pretrained classifier. Image-attribute classifier 704 can be used to identify (e.g., classify) an attribute of interest in the image. For example, image-attribute classifier 704 can predict whether an image contains a particular clothing category (e.g., dress or t-shirt). As another example, image-attribute classifier 704 can predict whether an image contains a particular pose (e.g., forward or backward).

The randomly generated latent vector used by image generation neural network 702 to generate the image along one or more attributes of interest determined in the images using image-attribute classifier 704 can be fed into latent-attribute linear classifier 706. This latent-attribute linear classifier can be trained using such information to learn a linear separating plane over dimensions of a latent space related to a particular attribute. For instance, latent-attribute linear classifier 706 can indicate a hyperplane in a feature space that separates one feature value from another (e.g., clothing category t-shirt from clothing category dress).

Coefficients of latent-attribute linear classifier 706 can be used to form directional vectors to directly control any number of desired attributes. For instance, let $\mathcal{D} = \{X\}_{I=1}^{N}$ be a dataset. G can denote a generator from image generation neural network 702 such that G: z→$\tilde{X}$ where z denotes the randomly generated latent vector and $\tilde{X}$ denotes the image generated by image generation neural network 702. Let $C_i^{I\,A}$ be image-attribute classifier 704 for the $i^{th}$ attribute and $C_i^{L\,A}$ be latent-attribute linear classifier 706 for the $i^{th}$ attribute such that: $C_i^{I\,A}$: $\tilde{X}$→class of $i^{th}$ attribute and $C_i^{L\,A}$: $d_i^T z+b=0$ where $d_i$ is the directional vector for the $i^{th}$ attribute.

Figure 8:
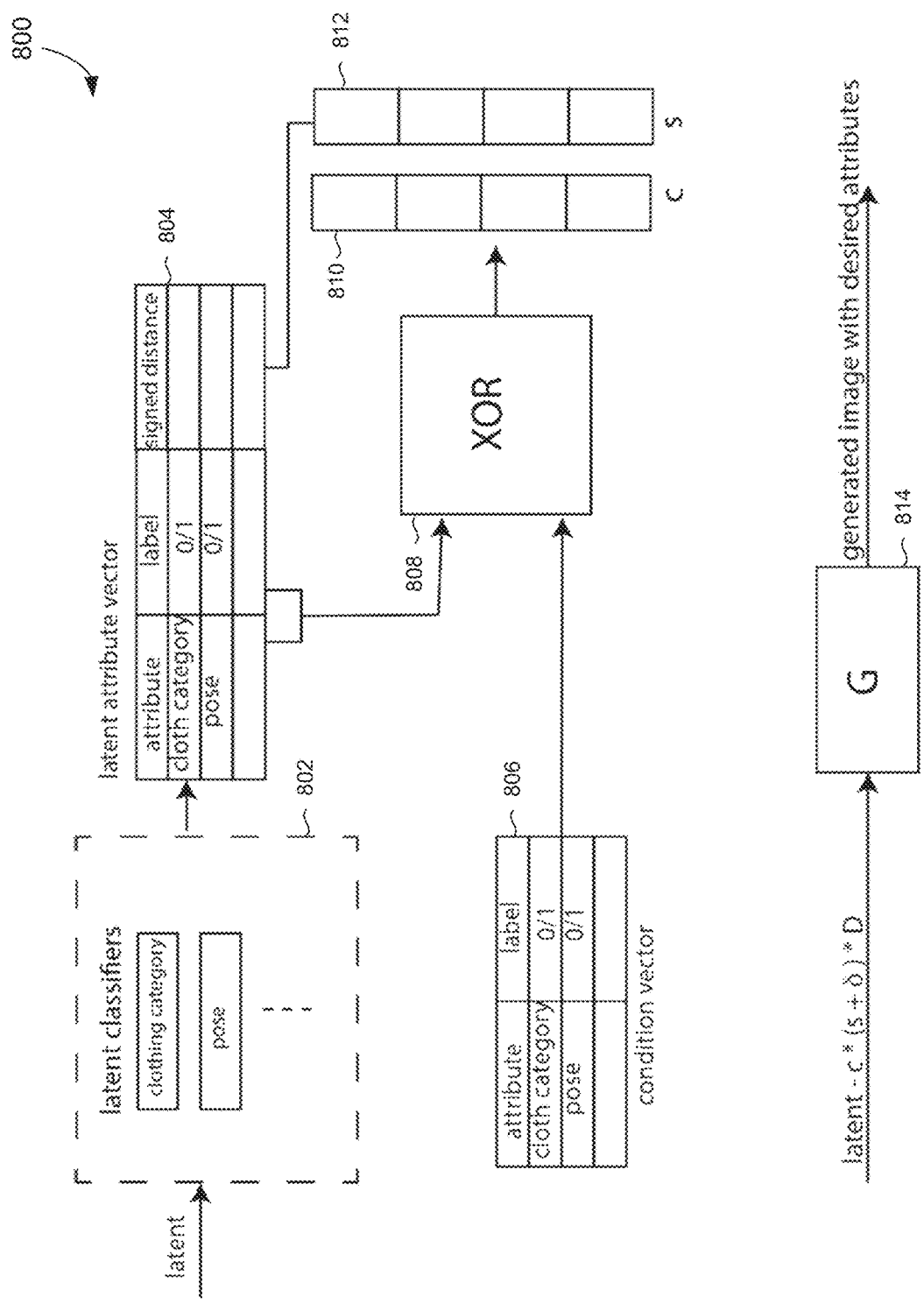
FIG. 8 illustrates an example environment that can be used for running a trained directional-GAN to generate images conditioned on desired attributes, in accordance with embodiments of the present disclosure.

FIG. 8 illustrates an example environment that can be used for running a trained directional-GAN 800 to generate images conditioned on desired attributes, in accordance with embodiments of the present disclosure. A randomly generated latent vector can be input into a trained latent-attribute linear classifier 802. Trained latent-attribute linear classifier 802 can generate output 804. Output 804 can comprise labels corresponding to each attribute. Output 804 can be XORed 808 with conditioning vectors from input 806. Input 806 can comprise one or more desired attributes. The desired attributes can be selected or input in any manner. For example, a user may select one or more desired attributes. Such attributes can be selected from, for example, a list of attributes on which directional-GAN 800 has been trained to condition images. XOR 808 results in choose vector c 810. Choose vector c 810 can have 1s where the randomly generated latent vector is likely to generate an attribute different from the desired attribute (e.g., as designated by input 806) and 0 otherwise. For attributes that do not align with the desired attribute, modifications can be applied to move the randomly generated latent vector in the appropriate direction along the linear combination of directional vectors. For instance, for each attribute that needs modification, a signed distance of the randomly generated latent vector from the separating hyperplane can be determined. The randomly generated latent vector can then be moved in the required direction (e.g., by an amount equal to the negative of signed distance and some delta (e.g., because the signed distance would place the weighted randomly generated latent vector directly on the hyperplane).

For instance, let $H_i$: $d_i^T x+b=0$ be an equation that represents the hyperplane for the $i^{th}$ latent-attribute linear classifier of latent-attribute linear classifier 802. Further, let $$D = \begin{bmatrix} -\hat{d}_1 - \\ -\hat{d}_2 - \\ \vdots \\ -\hat{d}_n - \end{bmatrix}$$

be the matrix with each row denoting a unit directional vector for an attribute. An update can be made to the randomly generated latent vector, as follows:

$$\underset{1 \times 512}{z'} = \underset{1 \times 512}{z} - \left[ \underset{1 \times n}{c} * \left( \underset{1 \times n}{s} + \delta \right) \right] * \underset{n \times 512}{D}$$

where c is choose vector 810 output of XOR 808 where an XOR operation between an input conditioning vector from input 806 and a latent attribute vector from output 804. s can be a vector of signed distances 812 where each $s_i$ is the signed distance from z to hyperplane $H_i$ given by, $$s_i = -\frac{d_i^T z + b}{\|d_i\|}.$$

Such a shifted randomly generated latent vector can then be input into image generation neural network 814 to generate an image with the desired attributes.

Figure 9A:
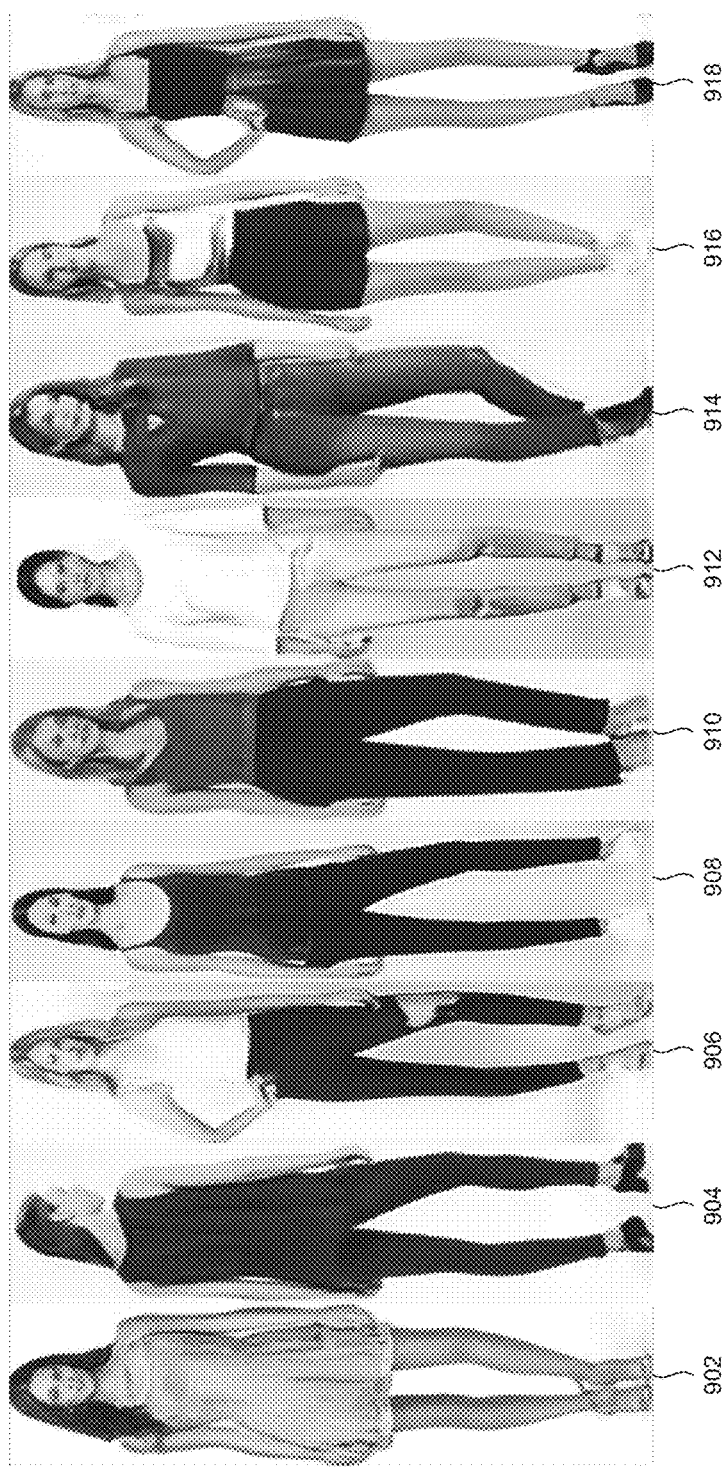
FIGS. 9A-9C illustrate example images generated using a directional-GAN, in accordance with embodiments of the present disclosure.
Figure 9B:
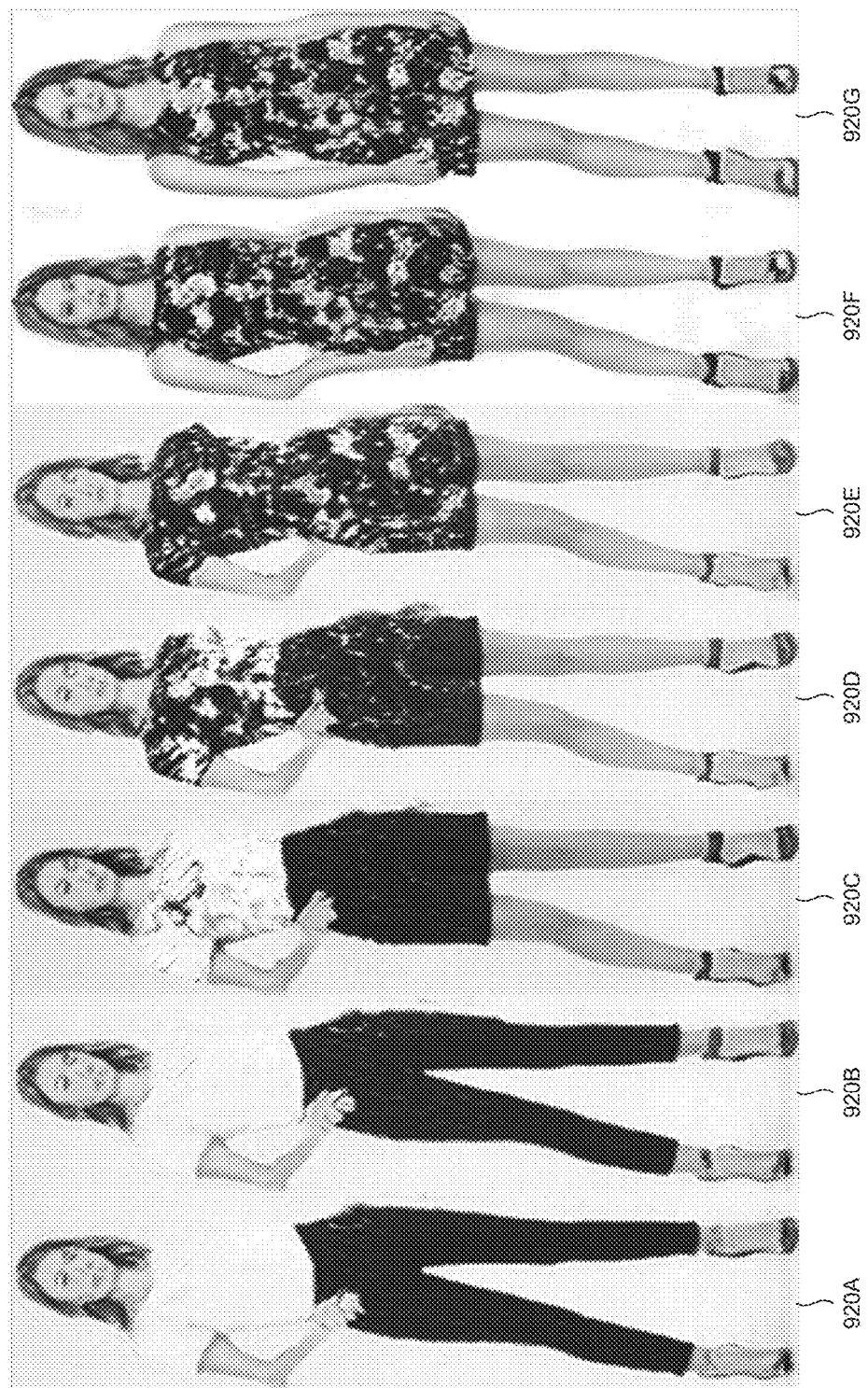
Figure 9C:

FIGS. 9A-9C illustrates example images 900A-900C generated using a directional-GAN, in accordance with embodiments of the present disclosure, in accordance with embodiments of the present disclosure, such as those described above in connection with FIGS. 1-8. For instance, FIG. 9A depicts example images 900A generated by an attribute-based image generation system using a directional-GAN. In particular, such a directional-GAN can be trained based on desired attributes: style of clothing (e.g., a t-shirt or dress) and pose of the person in the image (e.g., a front pose or a back pose). In some embodiments, images 900A can be images generated using a generator of the directional-GAN (e.g., unconditional generation of images). In other embodiments, image 902 can be an image generated by the attribute-based image generation system using the directional-GAN having desired attributes: dress and front pose. Image 904 can be generated based on desired attributes: t-shirt and back pose. Image 906 can be generated based on desired attributes: t-shirt and front pose. Image 908 can be generated based on desired attributes: t-shirt and front pose. Image 910 can be generated based on desired attributes: t-shirt and front pose. Image 912 can be generated based on desired attributes: t-shirt and front pose. Image 914 can be generated based on desired attributes: t-shirt and front pose. Image 916 can be generated based on desired attributes: dress and front pose. Image 918 can be generated based on desired attributes: dress and front pose.

FIG. 9B depicts example images 900B generated by an attribute-based image generation system using a directional-GAN. FIG. 900B depicts various images 920A-920G that can be generated by generated by the attribute-based image generation system using the directional-GAN based on different weights applied to the same latent vector. For instance, such images can depict a smooth transition from a person wearing a t-shirt to wearing a dress (e.g., based on moving a latent vector from a subspace associated with a t-shirt to a subspace associated with a dress). In particular, image 920A can be generated when the latent vector is determined to fall into the feature space that relates to the desired attribute "t-shirt." When necessary, in order to have the latent vector fall into the "t-shirt" space, the latent vector can be heavily weighted to move the latent vector into the space of the desired attribute (e.g., "t-shirt"). Image 920G, on the other hand, can be generated when the latent vector is determined to fall into the feature space that relates to the desired attribute "dress." When necessary, in order to have the latent vector fall into the "dress" space, the latent vector can be heavily weighted to move the latent vector into the space of the desired attribute (e.g., "dress"). Images 920B-920F depict images based on various weightings of the latent vector.

FIG. 9C depicts example images 900C generated by an attribute-based image generation system using a directional-GAN. FIG. 900C depicts various images 922A-922B that can be generated by generated by the attribute-based image generation system using the directional-GAN based on different weights applied to the same latent vector. For instance, such images can depict a transition from a person with a back pose to a front post (e.g., based on moving a latent vector from a subspace associated with a back pose to a subspace associated with a front pose). In particular, image 922A can be generated when the latent vector is determined to fall into the feature space that relates to the desired attribute "back pose." When necessary, in order to have the latent vector fall into the "back pose" space, the latent vector can be heavily weighted to move the latent vector into the space of the desired attribute (e.g., "back pose"). Image 922B, on the other hand, can be generated when the latent vector is determined to fall into the feature space that relates to the desired attribute "front pose." When necessary, in order to have the latent vector fall into the "front pose" space, the latent vector can be heavily weighted to move the latent vector into the space of the desired attribute (e.g., "front pose"). Such a latent vector as images 922A-922B can also fall into the feature space that relates to the desired attribute "t-shirt." When necessary, in order to have the latent vector fall into the "t-shirt" space, the latent vector can be weighted to move the latent vector into the space of the desired attribute (e.g., "t-shirt").

Figure 10:
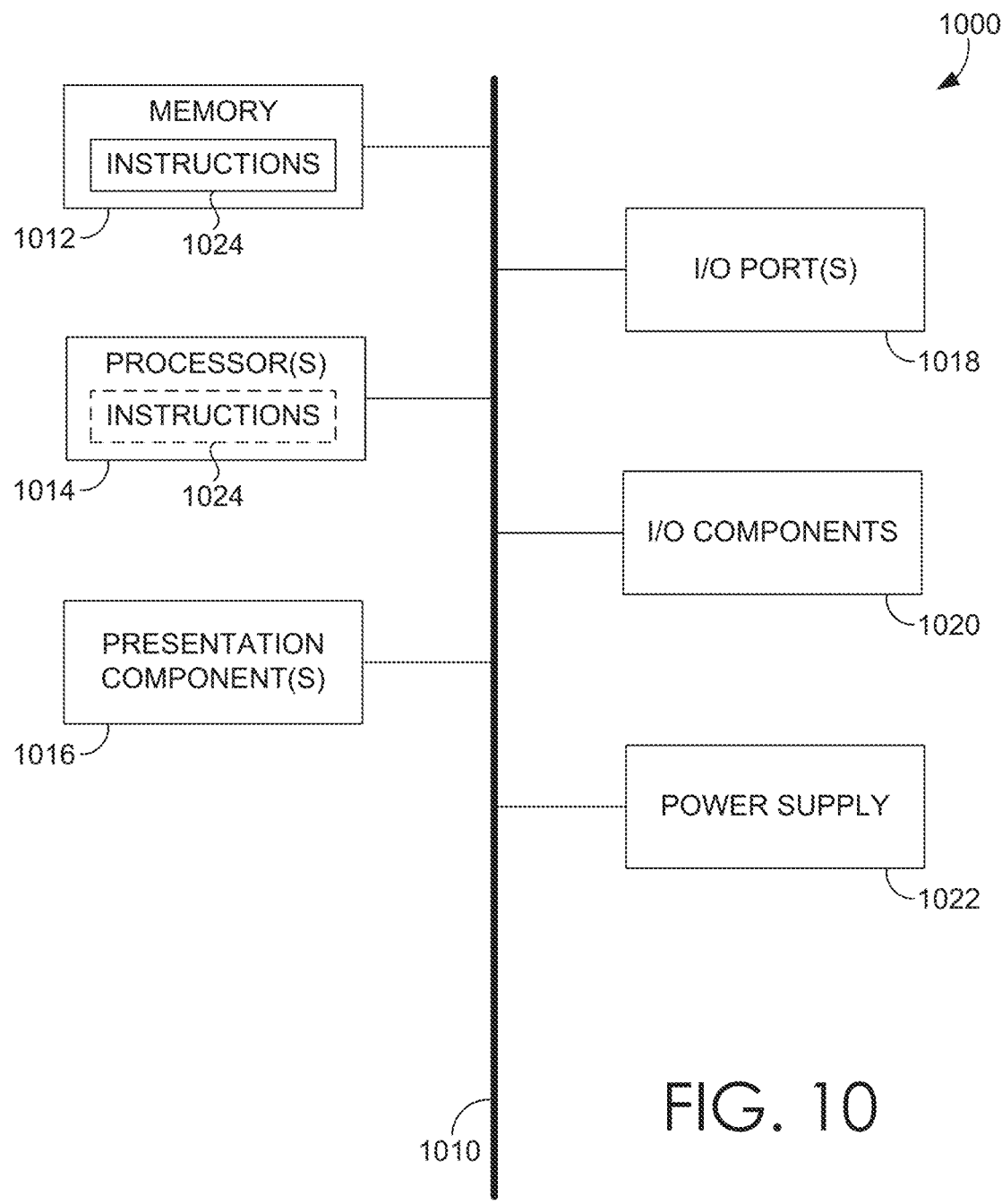
FIG. 10 is a block diagram of an example computing device in which embodiments of the present disclosure may be employed.

Having described embodiments of the present invention, an example operating environment in which embodiments of the present invention may be implemented is described below in order to provide a general context for various aspects of the present invention. Referring to FIG. 10, an illustrative operating environment for implementing embodiments of the present invention is shown and designated generally as computing device 1000. Computing device 1000 is but one example of a suitable computing environment and is not intended to suggest any limitation as to the scope of use or functionality of the invention. Neither should the computing device 1000 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 10, computing device 1000 includes a bus 1010 that directly or indirectly couples the following devices: memory 1012, one or more processors 1014, one or more presentation components 1016, input/output ports 1018, input/output components 1020, and an illustrative power supply 1022. Bus 1010 represents what may be one or more busses (such as an address bus, data bus, or combination thereof). Although the various blocks of FIG. 10 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 10 is merely illustrative of an example computing device that can be used in connection with one or more embodiments of the present disclosure. Distinction is not made between such categories as "workstation," "server," "laptop," "hand-held device," etc., as all are contemplated within the scope of FIG. 10 and reference to "computing device."

Computing device 1000 typically includes a variety of non-transitory computer-readable media. Non-transitory Computer-readable media can be any available media that can be accessed by computing device 1000 and includes both volatile and nonvolatile media, removable and non-removable media. By way of example, and not limitation, non-transitory computer-readable media may comprise non-transitory computer storage media and communication media.

Non-transitory computer storage media include volatile and nonvolatile, removable and non-removable media implemented in any method or technology for storage of information such as computer-readable instructions, data structures, program modules or other data. Non-transitory computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Non-transitory computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1012 includes computer storage media in the form of volatile and/or nonvolatile memory. As depicted, memory 1012 includes instructions 1024. Instructions 1024, when executed by processor(s) 1014 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Illustrative presentation components include a display device, speaker, printing component, vibrating component, etc.

I/O ports 1018 allow computing device 1000 to be logically coupled to other devices including I/O components 1020, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented method, comprising:
   receiving a latent vector and a first desired attribute;
   determining a feature subspace for the latent vector using one or more latent-attribute linear classifiers trained to determine a first relationship between the latent vector and the first desired attribute;
   receiving a second desired attribute;
   determining a second relationship between the latent vector and the second desired attribute; and
   generating an image, using the latent vector, wherein the image contains the desired first and second desired attributes.

2. The computer-implemented method of claim 1, further comprising:
   comparing the feature subspace with a desired feature subspace, the desired feature subspace associated with the desired attribute; and
   based on the comparison indicating that the feature subspace differs from the desired feature subspace, applying a directional vector to the latent vector that shifts the latent vector from the feature subspace to the desired feature subspace.

3. The computer-implemented method of claim 2, wherein the directional vector is a delta plus a signed distance from the latent vector to a hyperplane separating the desired feature subspace from other feature subspaces, the delta moving the latent vector over the hyperplane.

4. The computer-implemented method of claim 1, wherein the one or more latent-attribute linear classifiers are progressively trained at more than one resolution.

5. The computer-implemented method of claim 4, further comprising:
comparing the second feature space with a second desired feature space, the second desired feature space associated with the second desired attribute; and
based on the comparison indicating that the second feature space differs from the second desired feature space, applying a second directional weight to the latent vector that shifts the latent vector from the second feature space to the second desired feature space.

6. The computer-implemented method of claim 1, wherein the latent vector is a randomly generated latent vector and the desired attribute is input by a user.

7. The computer-implemented method of claim 1, wherein training the latent-attribute linear classifier comprises:
receiving a set of classified images and corresponding latent vectors; and
learning a linear separating plane between the feature subspace and another feature subspace, wherein the feature subspace is associated with a first attribute value and the other feature space is associated with a second attribute value.

8. The computer-implemented method of claim 1, wherein a set of classified images are generated using a trained image generation neural network that are classified using an image-attribute classifier.

9. The computer-implemented method of claim 1, wherein a trained image generation neural network that generated full-body images of people is used for generating the image that contains the desired attributes.

10. One or more computer storage media storing computer-useable instructions that, when used by one or more computing devices, cause the one or more computing devices to perform operations comprising:
receiving a latent vector and a desired attribute;
determining a feature subspace for the latent vector using a latent-attribute linear classifier progressively trained at more than one resolution to determine a relationship between the latent vector and the desired attribute; and
generating an image, using the latent vector, wherein the image contains the desired attribute.

11. The one or more computer storage media of claim 10, the operations further comprising:
comparing the feature subspace with a desired feature subspace, the desired feature subspace associated with the desired attribute; and
based on the comparison indicating that the feature subspace differs from the desired feature subspace, applying a directional vector to the latent vector that shifts the latent vector from the feature subspace to the desired feature subspace.

12. The one or more computer storage media of claim 11, wherein the magnitude of the directional vector is a delta plus a signed distance from the latent vector to a hyperplane separating the feature subspace from the desired feature subspace, the delta moving the latent vector over the hyperplane.

13. The one or more computer storage media of claim 10, further comprising:
receiving a second desired attribute; and
determining a second feature space for the latent vector using a second latent-attribute linear classifier trained to determine a second relationship between the latent vector and the second desired attribute.

14. The one or more computer storage media of claim 13, further comprising:
comparing the second feature space with a second desired feature space, the second desired feature space associated with the second desired attribute; and
based on the comparison indicating that the second feature space differs from the second desired feature space, applying a second directional weight to the latent vector that shifts the latent vector from the second feature space to the second desired feature space.

15. The one or more computer storage media of claim 10, wherein the latent vector is a randomly generated latent vector and the desired attribute is input by a user.

16. The one or more computer storage media of claim 10, wherein training the trained latent-attribute linear classifier comprises:
receiving a set of classified images and corresponding latent vectors; and
learning a linear separating plane between the feature space and another feature space, wherein the feature space is associated with a first attribute and the other feature space is associated with a second attribute.

17. The one or more computer storage media of claim 10, wherein a set of classified images are generated using a trained image generation neural network that are classified using an image-attribute classifier.

18. The one or more computer storage media of claim 10, wherein a trained image generation neural network that generated full-body images of people is used for generating the image that contains the desired attribute.

19. A computing system comprising:
means for receiving a latent vector;
means for classifying the latent vector to be in a feature subspace as a desired attribute;
means for applying a directional vector to the latent vector that shifts the latent vector from one feature subspace to another feature subspace associated with the desired attribute; and
means for generating an image, using the latent vector, wherein the image contains the desired attribute.

20. The computing system of claim 19, wherein the desired attribute is a pose.

* * * * *